United States Patent
Craft et al.

(10) Patent No.: US 9,607,231 B2
(45) Date of Patent: *Mar. 28, 2017

(54) USE OF RELATIVELY PERMANENT PIGMENTED OR VASCULAR SKIN MARK PATTERNS IN IMAGES FOR PERSONAL IDENTIFICATION

(71) Applicants: LOS ANGELES BIOMEDICAL RESEARCH INSTITUTE AT HARBOR-UCLA MEDICAL CENTER, Torrance, CA (US); NANYANG TECHNOLOGICAL UNIVERSITY, Singapore (SG)

(72) Inventors: Noah Ames Craft, Venice, CA (US); Wai Kin Adams Kong, Nanyang Cresent (SG); Arfika Nurhudatiana, Jurong West (SG)

(73) Assignee: Los Angeles Biomedical Research Institute at Harbor-UCLA Medical Center, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,258

(22) Filed: Sep. 15, 2015

(65) Prior Publication Data

US 2016/0004918 A1 Jan. 7, 2016

Related U.S. Application Data

(63) Continuation of application No. 14/301,189, filed on Jun. 10, 2014, now Pat. No. 9,152,867, which is a
(Continued)

(51) Int. Cl.
*G06K 9/00* (2006.01)
*G06K 9/62* (2006.01)
(Continued)

(52) U.S. Cl.
CPC ....... *G06K 9/00885* (2013.01); *G06K 9/6202* (2013.01); *G06T 3/0006* (2013.01);
(Continued)

(58) Field of Classification Search
CPC .............. G06K 9/00885; G06K 9/6202; G06T 2207/30088; G06T 3/0006; G06T 7/003
(Continued)

(56) References Cited

U.S. PATENT DOCUMENTS 7,352,448 B2 4/2008 Kono et al.
7,835,576 B2 11/2010 Kang et al.
(Continued)

FOREIGN PATENT DOCUMENTS

WO   WO 2008/054396   5/2008

OTHER PUBLICATIONS

Anderson, et al., "The Optics of Human Skin", J. Invest. Dermatol, (1981) 77(1):13-19.
(Continued)

*Primary Examiner* — Manuchehr Rahmjoo
(74) *Attorney, Agent, or Firm* — Sheppard Mullin Richter & Hampton LLP

(57) ABSTRACT

Embodiments include methods, devices, software, and systems for identifying a person based on relatively permanent pigmented or vascular skin mark (RPPVSM) patterns in images. Locations of RPPVSMs in different images of people are point matched, and a correspondence probability that the point matched RPPVSMs are from different people is calculated. Other embodiments are also described. Other embodiments are also described and claimed.

20 Claims, 17 Drawing Sheets

Related U.S. Application Data continuation of application No. 13/457,340, filed on Apr. 26, 2012, now Pat. No. 8,787,625.

(60) Provisional application No. 61/479,795, filed on Apr. 27, 2011.

(51) Int. Cl.
　　*G06T 3/00* 　　　(2006.01)
　　*G06T 7/00* 　　　(2017.01)

(52) U.S. Cl.
　　CPC .... *G06T 7/003* (2013.01); *G06K 2009/00932* (2013.01); *G06K 2209/05* (2013.01); *G06T 2207/30088* (2013.01)

(58) Field of Classification Search
　　USPC ........................................................ 382/115
　　See application file for complete search history.

(56) References Cited

U.S. PATENT DOCUMENTS

| | | | |
|---|---|---|---|
| 2005/0271258 A1* | 12/2005 | Rowe ................ | G06K 9/00046 382/124 |
| 2007/0043527 A1 | 2/2007 | Quan et al. | |
| 2009/0294667 A1 | 12/2009 | Gorian et al. | |
| 2010/0166304 A1* | 7/2010 | Chen-Hung ......... | G06K 9/4652 382/167 |
| 2010/0296697 A1 | 11/2010 | Ikenoue | |
| 2011/0243397 A1 | 10/2011 | Watkins et al. | |

OTHER PUBLICATIONS

Chou, et al., "A Simple Algorithm for Removing Blocking Artifacts in Block-Transform Coded images", IEEE Signal Processing Letters, (1998), 5(2):33-35.
Claridge, et al., "From Colour to Tissue Histology: Physics-Based Interpretation of Images of Pigmented Skin Lesios", Med. Image Aal., (2003), 7: 489-502.
Cotton, et al, "Developing a predictive model of skin colouring", In SPIE vol. 2708, Medical Imaging, (1996), pp. 814-825.
Diffey, "A Mathematical Model for Ultravbiolet Optics in Skin", Phys. Med. Biol., (1983), 28(6):647-657.
Doi, et al., "Spectral Estimation of Human Skin Color Using the Kubelka-Munk Theory", In SPIE-IS&T Electronic Imaging, SPIE, (2003), 5008: 221-228.
Donner, et al., "A Spectral BSSRDF for Shading Human Skin", Proceedings of the Eurographics Symposium on Rendering, (2006), pp. 409-417.
Foi, et al., Pointwise Shape-Adaptive DCT for High-Quality Denoising and Deblocking of Grayscale and Color Images:, IEEE TIP, (2007), 16(5): 1395-1411.
Freeman, et al., "Example-based super resolution", MERL Computer Graphics, (2002), 22(2):56-65.
Freeman, et al., "Learning Low-Level Vision", IJCV, (2000), 40(1):25-47.
Gnee, "A Study of Hand Vein, Neck Vein and Arm Vein Extraction for Authentication", 7th International Conference on Information, Communication and Signal Processing, (Dec. 8, 2009), pp. 1-4.
Jacques, "Skin Optics", Oregon Medical Laser Center, http://omic.ogi.edu/news/jan98/skipoptics.html, (1998).
Kubelka, "New contribution to the Optics of Intensely Light-Scatterin Materials, Part !", JOSA, (1948).
Lin, et al., "Biiometric Verification Using Thermal Images of Palm-Dorsa Vein Patterns", IEEE Transaction on Circuits and Systems for Video Technology, (2004), 14(2):199-213.
Luo, et al., "Removing the Blocking Artifacts of Block-Based DCT Compressed Images", IEEE TIP, (2003).
Motivans, et al., "Federal Prosecution of Child Sex Exploitation Offenders, 2006", Bureau of Justic Statistics, (Dec. 2007), NCJ 219412.
Störring, "Computer Vision and Human Skin Colour", PhD Tehsis, Aalborg University, (2004).
Sun, et al., "Postprocessing of Low Bit-Rate Block DCT Coded Images Based on a Fields of Experts Prior", IEEE TIP, (2007), 16(11): 2743-2751.
Tsumura, etal., "Independent-Component Analysis of Skin Color Image", (JOSA(A), (1999), 16(9):2169-2176.
Van Gemert, et al., "Skin Optics", IEEE Trans. Biomed. Eng. (1989), 36(912): 116-1154.
Wan, et al., "Analytical Modeling for the Optical Properties of Skin with In Vitro and In Vivo Applications", Photochem. Photobiol, (1981), 34(4): 493-499.
Wang, et al., "Image Quality Assessment: From Error Visibility to Structural Similarity", IEEE TIP, (2004), 13(4): 600-612.
Wang, et al., "Mean Squared Error: Love it or Leave it?: A new look at signal fidelity measures", IEEE Signal Processing Magazine, (2009), 26(1):98-117.
Wang, et al., "Why is image quality assessment so difficult?", Proceedings of the IEEE ICASSP, (May 2002).
Watanabe, et al., "Vein Authentication Using Color Information and Image Matching with High Performance on Natural Light", ICCAS-SICE, (Aug. 2009), pp. 3625-3629.

* cited by examiner

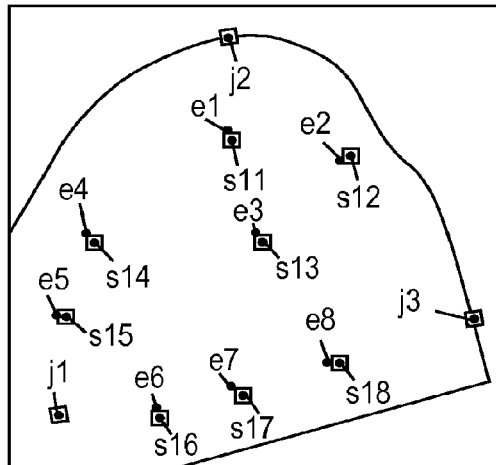
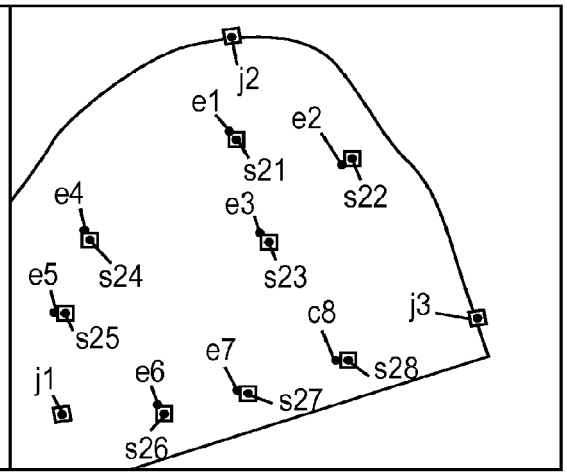
FIG. 4A　　　　　　　FIG. 4B
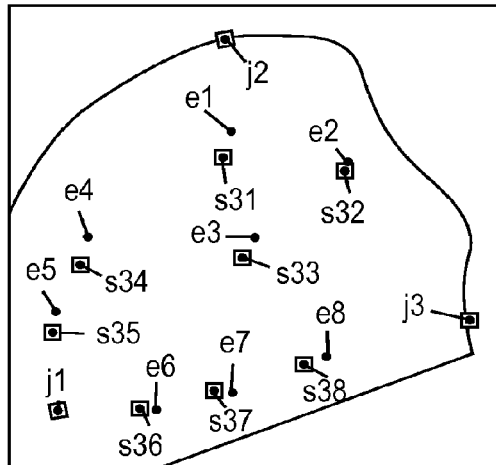
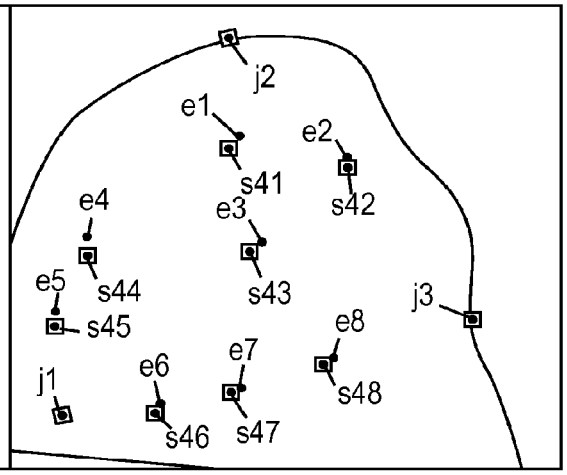
FIG. 4C　　　　　　　FIG. 4D

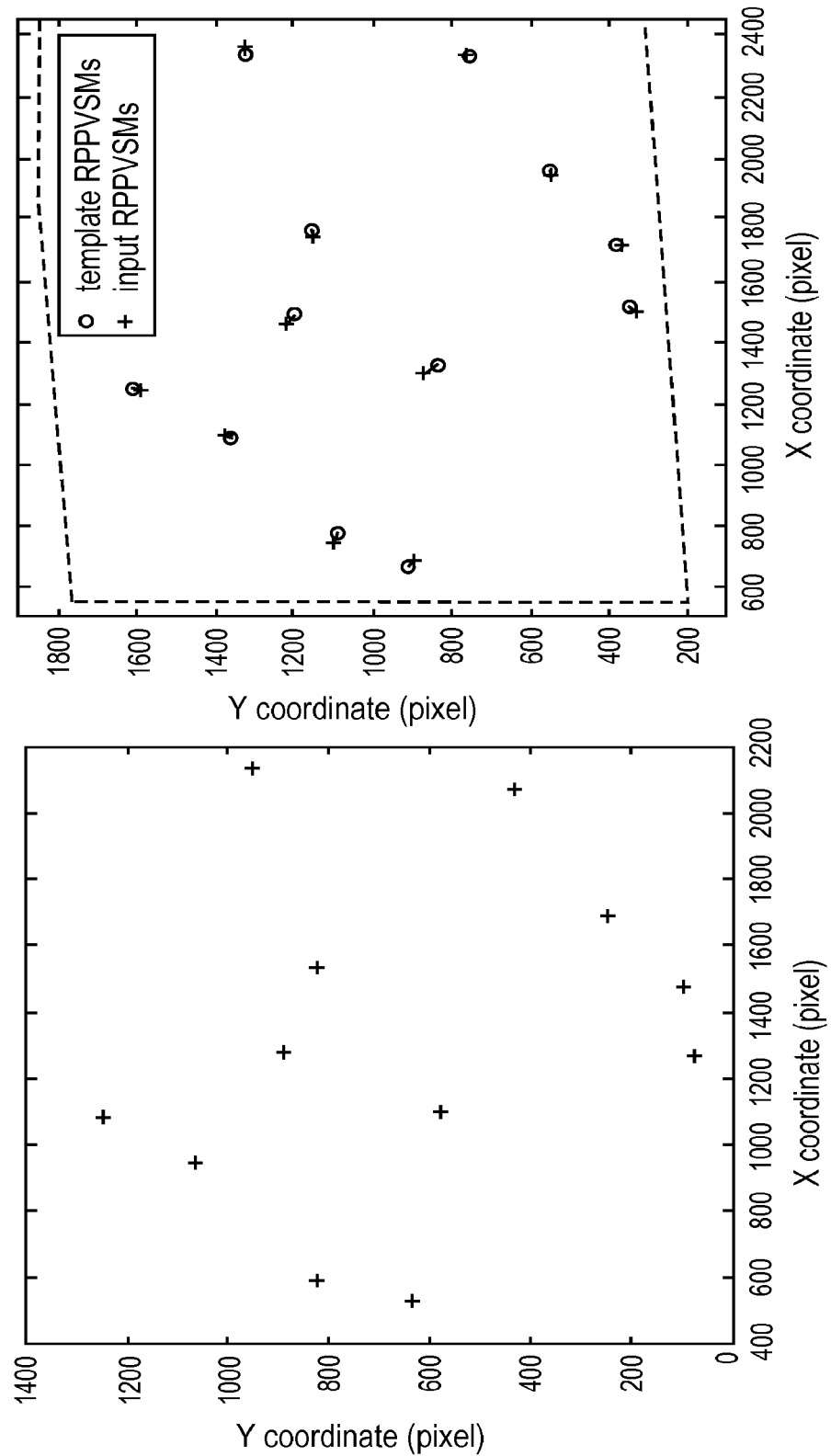

USE OF RELATIVELY PERMANENT PIGMENTED OR VASCULAR SKIN MARK PATTERNS IN IMAGES FOR PERSONAL IDENTIFICATION

CROSS-REFERENCE TO RELATED APPLICATION

This application is a continuation of U.S. application Ser. No. 13/457,340, filed on Apr. 26, 2012, which is a utility application of Provisional U.S. Patent Application No. 61/479,795, filed Apr. 27, 2011, entitled "Use of Relatively Permanent Pigmented or Vascular Skin Mark Patterns In Images For Personal Identification."

FIELD

Embodiments are related to identification of a person based on relatively permanent pigmented skin mark patterns in images. Relatively permanent pigmented or vascular skin marks (RPPVSM) include but are not limited to nevi, lentigos, ephilides, seborrheic keratoses, and cherry hemangiomas. Locations of RPPVSM in different images of people are point matched, and a correspondence probability that the point matched RPPVSM are from different people is calculated (e.g., which may also provide a probability that they are from the same person). Other embodiments are also described.

BACKGROUND

Recent technological advances have allowed for a proliferation of digital media, which may include images of crimes being committed. For example, child pornography, statutory rape, masked gunmen, and other crimes may be captured on digital media such as digital images and video. This media can be used as evidence in legal cases, but commonly the perpetrator in the images can not be identified since his face is obscured and the images don't contain any traditional biometric data like fingerprints or palm prints.

Notably, among major categories of crime, child sex abuse has the lowest percentage of suspects prosecuted among all offenses. A declination for prosecution by U.S. attorneys does not mean that the suspect did not commit a Federal offense. The major reason for these declinations is weak/inadmissible evidence. Accurate biometric identification of suspects in child sex abuse cases and other crimes evidenced in digital media would greatly enhance the ability of prosecutors to achieve convictions.

Child pornography can include images of nude children or self-pornography that includes self photography of sexual acts with children. Criminals are usually careful to not show their faces in self-pornography for fear of identification. However, it is not uncommon to be able to observe bare skin of other body parts (such as the thighs) of the abuser. Thus, it may be desirable to identify a person based on areas of skin noted in digital photographs of these and other criminal acts.

SUMMARY

Embodiments include methods, devices, software, and systems for identifying a person based on relatively permanent pigmented or vascular mark (RPPVSM) patterns in images. One method includes identification of a person based on relatively permanent pigmented or vascular skin mark patterns in images. Locations of RPPVSM in different images of people are point matched, and a correspondence probability that the point matched RPPVSMs are from different people is calculated. Other embodiments are also described.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

FIGS. 4A-H show eight second images, RPPVSMs, and registration points.

FIGS. 11A-F show an illustration of the matching process.

DETAILED DESCRIPTION

Figure 1:
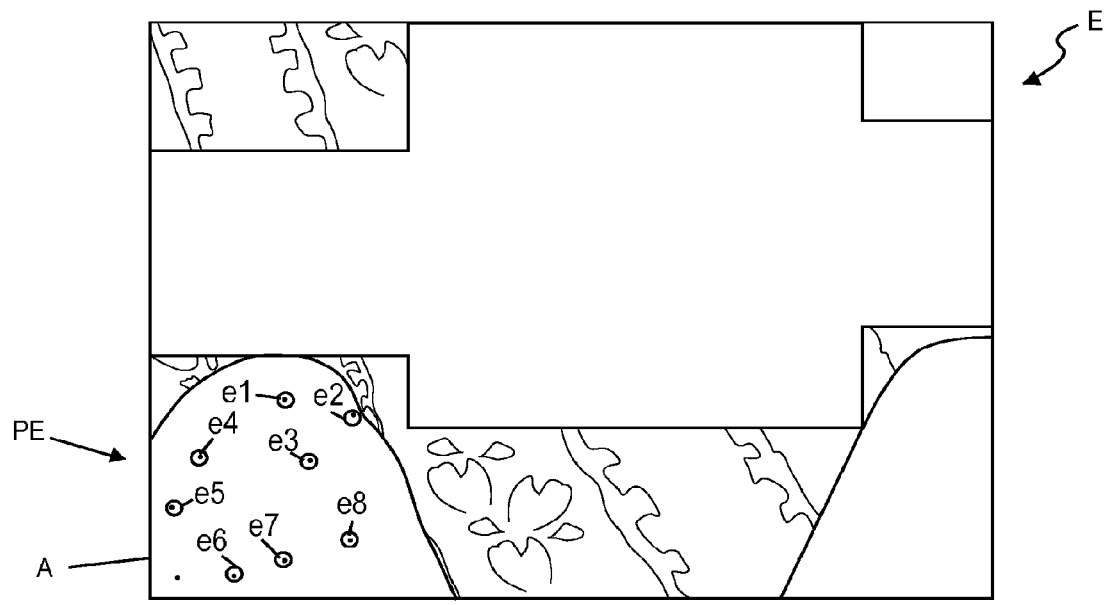
FIG. 1 shows a first image with a first pattern of RPPVSMs.

Several embodiments of identification of a person based on relatively permanent pigmented and vascular skin mark (RPPVSM) patterns in images, with reference to the appended drawings, are now explained. Whenever the shapes, relative positions and other aspects of the parts described in the embodiments are not clearly defined, the scope is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

Embodiments determine if identification of RPPVSM patterns would be a reliable and accurate way to positively identify a person or a suspect in this criminal matter. RPPVSM are composed of a group of normal skin marks that are a manifestation of increased pigment or increased vascularity. They include, but are not limited to several classes of nevi, seborrheic keratoses, ephiledes (freckles), lentigos (sun spots), and cherry hemangiomas. For the purposes of this application, a nevus is used as an example of an RPPVSM. A nevus (commonly known as a mole) is considered relatively permanent and can be identified by an expert as a sharply circumscribed and pigmented lesion of the skin. Although the biometric community has not studied nevus patterns previously, it is suggested that patterns of RPPVSMs fulfill the conditions of being a hard biometric trait like a fingerprint.

There are two classes of biometric traits. One is the traditional (hard) biometric traits (e.g. fingerprint, iris and palmprint). These are unique for each individual. This includes uniqueness between identical twins, who share the same DNA sequence with his/her twin sibling. The other is called soft biometrics (e.g. height and skin color) that provides partial information of a person's identity. Soft biometrics are used in forensic investigations. For example, the Federal Bureau of Investigation (FBI) uses the height of a suspect to limit their fingerprint search. If a biometric trait fulfills the following three conditions, it would be consider a hard biometric trait:
  a) Universality—that almost every person should have the characteristic.
  b) Uniqueness—how well the biometric distinguishes individuals from one another.
  c) Permanence—that a biometric changes slowly over time.

For example, using tattoos to identify a person has been considered. However, this trait is not very universal. Thus, they do not qualify as a hard biometric trait. On the other hand, the nevus pattern satisfies the condition of universality since almost all individuals have identifiable nevi. Uniqueness is best examined by comparing monozygotic twin pairs, whose biometric traits are expected to be the most similar. We know that total body nevus count is partially determined by genetics, but the anatomic location of nevi is genetically independent. Although we know that the total number of nevi changes with age, this process is very slow. Additionally, the loss of nevi can occur by immunological mechanisms (halo nevi), but this process is exceedingly rare and also occurs slowly. Thus, the nevus pattern fulfills all the three conditions being a hard biometric trait.

Comparing RPPVSM patterns from two different images can be formulated as a point matching problem. Using a point matching model, the discrimination power of RPPVSM patterns for personal identification is defined here. By comparing the patterns of RPPVSMs between the digital criminal evidence and digital medical pictures of the suspect in custody, it is possible to develop correspondence probabilities that could predict the likelihood of positive identification. The initial calculations are demonstrated using model parameters and then applied to the actual case. Using this approach, from the RPPVSM pattern on only one thigh, it has been possible to determine the probability that the RPPVSM pattern identified the suspect in error was 3.1338e-009. This technique has great potential for suspect identification from partial skin images in illegal digital media like child pornography or in cases of suspected terrorism.

Embodiments use pigmented or vascular skin marks as biometric markers to positively identify individuals from digital media (e.g., criminal evidence). A nevus is commonly known as a mole (nevi is plural) and is one example of an RPPVSM. For biometric recognition, RPPVSM patterns are compared between confiscated criminal digital evidence and digital images taken of a suspect in custody. Findings on the digital images taken in custody can be confirmed by direct physical examination of the suspect.

One goal of biometric recognition is to estimate the probability of two features being from different persons. There are two approaches to perform this estimation. One is a theoretical approach that is based on a set of assumptions and the other is an experimental approach that is based on a large database and a matching algorithm. To avoid the imperfection of the matching algorithms, the theoretical approach may be employed for forensic applications.

A Probability Model for Estimating the Correspondence of Nevi Patterns

RPPVSM on our skin can be considered as points on a two-dimensional space and therefore, matching of RPPVSM patterns can be formulated as a point matching problem. For the sake of convenience, a set of notations is defined. E and S represent an image collected from the crime scene (Evidence) and an image taken from the suspect (Suspect), respectively. Let the number of RPPVSMs in E and S be m and n, respectively. Let the location of a RPPVSM of E(S) in a two-dimensional space be $(x_{ie}, y_{ie})$ $(x_{is}, y_{is})$. Here, we assume that the RPPVSM patterns are aligned. If the distance between two points is shorter than r, i.e., $\sqrt{(x_{ie}-x_{is})^2+(y_{ie}-y_{is})^2}<r$, they are considered as a match-up. In addition to the parameter r, one more parameter A, the size of the overlapped total skin area of S and E in the two dimensional space, is required. It is assumed that all the points in S and E are inside this overlapped area. In the following calculation, r and A are measured in cm and $cm^2$, respectively.

To setup a mathematical model to match these points, we use the following set of assumptions. We use the example of nevi:
  1) Uniform distribution: It is assumed that nevi are uniformly distributed on the skin. Some may argue that this assumption is invalid because the sun-exposed parts of the body may have more nevi. Despite the fact that the distributions may vary somewhat between sun-exposed and sun-protected areas of skin, this argument is not sound for this example since only the non-sun-exposed parts are considered in this study. Besides the slight predilection for nevi to occur more frequently on sun-exposed skin, we are unaware of any literature refuting the locally uniform anatomic distribution of nevi.
  2) Independent event: It is assumed that the correspondence of a nevi pair is an independent event and each correspondence is equally important. This assumption is commonly accepted in the biometric community.
  3) One to one correspondence: It is assumed that each RPPVSM in S can match no more than one RPPVSM in E, and vice versa.
  4) Distance between two nevi: It is assumed that the distance between two nevi of the same subject is larger than r, otherwise, they may be considered as one RPPVSM.

The first two assumptions have been studied and may be discussed in a manuscript to be published in the future, currently titled "The Individuality of Relatively Permanent Pigmented or Vascular Skin Marks (RPPVSM) in Independently and Uniformly Distributed Patterns". Using these assumptions, the correspondence probability of the RPPVSM patterns in E and S being from different persons can be calculated from (equation 1):

$$p(A, C, n, m, p) = C_p^n \prod_{i=0}^{p-1} \left( \frac{(m-i)C}{A-iC} \right) \prod_{i=p}^{n-1} \left( \frac{A-(m-p+i)C}{A-iC} \right) \quad (1)$$

where $C=\pi r^2$, p is the number of matched points, and $C_p^n$ means $n!/p!(n-p)!$. The higher this probability is, the more unlikely S and E are from the same person. In some cases, this probability describes how common two persons have the same RPPVSM patterns.

Experimental Model Results Using Estimated Parameters

Let the area of skin surface of a hypothetical subject be 21,331 cm². This is the estimated skin surface area of a person whose height is 5'11" and weight is 200 lbs. These were converted to metric measurements and applied to the Mosteller formula to arrive at body surface area in square centimeters. The hypothetical probabilities of nevus pattern correspondence obtained from different values of m, n and r for A=21,331 are given in Table 1.

TABLE 1

Nevi pattern correspondence probabilities obtained from Equation 1 for different parameters, where A is estimated total skin surface area of the suspect's body.

| n | m | p | r (cm) | A (cm²) | P(A, C, n, m, p) |
|---|---|---|---|---|---|
| 24 | 24 | 4 | 2 | 21,331 | 2.5793e−004 |
| 24 | 24 | 8 | 2 | 21,331 | 2.7606e−010 |
| 24 | 24 | 12 | 2 | 21,331 | 5.8391e−018 |
| 32 | 32 | 4 | 2 | 21,331 | 0.0023 |
| 32 | 32 | 8 | 2 | 21,331 | 4.6560e−008 |
| 32 | 32 | 12 | 2 | 21,331 | 3.4897e−014 |
| 40 | 40 | 4 | 2 | 21,331 | 0.0111 |
| 40 | 40 | 8 | 2 | 21,331 | 1.8965e−006 |
| 40 | 40 | 12 | 2 | 21,331 | 1.6928e−011 |
| 24 | 24 | 4 | 1 | 21,331 | 1.2029e−006 |
| 24 | 24 | 8 | 1 | 21,331 | 4.4679e−015 |
| 24 | 24 | 12 | 1 | 21,331 | 3.6062e−025 |
| 32 | 32 | 4 | 1 | 21,331 | 1.3014e−005 |
| 32 | 32 | 8 | 1 | 21,331 | 9.1054e−013 |
| 32 | 32 | 12 | 1 | 21,331 | 2.4207e−021 |
| 40 | 40 | 4 | 1 | 21,331 | 7.7905e−005 |
| 40 | 40 | 8 | 1 | 21,331 | 4.5546e−011 |
| 40 | 40 | 12 | 1 | 21,331 | 1.4000e−018 |

It should be mentioned that the median nevus count in Caucasians is 32 for the age group between 51-60. Even though nevus pattern has not been studied as a hard biometric trait by biometric researchers, these probabilities clearly indicate that nevus pattern has extremely high discrimination power for personal identification—similar to fingerprint and iris.

Since this technology would normally be applied to a smaller area of skin, we applied it to an actual digital image from a criminal investigation. In this case, the images confiscated from the suspect's computer and those taken of the suspect in custody are compared.

FIG. 1 may be a redacted image confiscated from the suspect's computer which may be depicting an illegal sexual act with a minor where the perpetrator's face is not visible. The black circles show the location of nevi e1-e8 marked by a dermatologic expert (N.C.) and the red lines show the locations of varicose veins (not shown). In the following calculations, we only consider nevi as an example of RPPVSM. Specifically, FIG. 1 may show a first image E with a first pattern PE of nevi on leg A. In some cases, FIG. 1 may be an image from a still frame or video camera; an image considered evidence in a legal proceeding; and/or an image confiscated from suspect's computer. In some cases, FIG. 1 may be an image that is evidence for a legal proceeding.

Figure 2:
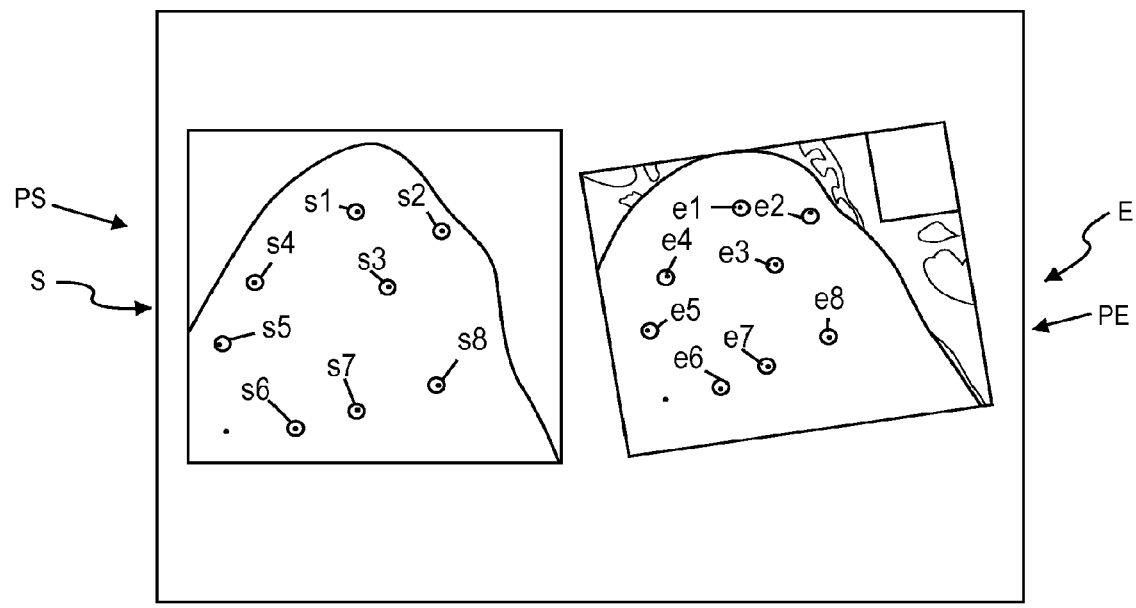
FIG. 2 shows the first image next to a second image with a second pattern of RPPVSMs.

FIG. 2 may show a side-by-side comparison of the images from the crime scene E and those taken from the suspect S. The correspondence probabilities for different image pairs obtained from different values of m, n and r are listed in Table 2, where A is roughly estimated by the inventors (N. C and A. K) based on the estimated size of a man's leg. Specifically, FIG. 2 may show the first image E next to a second image S with a second pattern of nevi PS on leg S. In some cases, FIG. 2 may be an image from a still frame or video camera; an image considered evidence in a legal proceeding; and/or an image of the suspect in custody. In some cases, FIG. 1 may be an image that is evidence for a legal proceeding. Thus, FIG. 2 may show a comparison of a confiscated image E with images of the suspect in custody S where A is the left knee of the suspect in custody; and B is the left knee from an image confiscated from the suspect's computer.

TABLE 2

Nevi pattern correspondence probabilities obtained from Equation 1 for different parameters.

| n | m | p | r (cm) | A (cm²) | P(A, C, n, m, p) |
|---|---|---|---|---|---|
| 8 | 8 | 4 | 2 | 400 | 0.0720 |
| 8 | 8 | 6 | 2 | 400 | 7.5971e−004 |
| 8 | 8 | 8 | 2 | 400 | 9.9737e−008 |
| 8 | 8 | 4 | 1 | 400 | 4.1060e−004 |
| 8 | 8 | 6 | 1 | 400 | 1.4441e−007 |
| 8 | 8 | 8 | 1 | 400 | 7.3060e−013 |

For this image, only the left thigh is considered. Other legitimate points on the right thigh would enhance the accuracy of identification, but are ignored here for brevity. If this formula is applied to the images using moderately strict performance parameters where we can match 8 matching points from the same images and r is still only 2 cm, the probability of these two sets of images being from different persons is 9.9737e-008.

The parameters in this model may have been estimated up until now by experience. To systematically estimate these parameters based on real nevus patterns we used 8 different images from the same suspect and compared it to one reference photo from evidence. The eight images taken from the suspect were transformed based on registration points from the evidence image (e.g., see FIGS. 4A-H). This transformation is used to reduce image differences due to variation of view angles or distance from the subject. Then, the nevi in all images are projected onto the same two-dimensional space and the required parameters can be calculated in that space. The methods used for transformation and the correspondence probabilities are discussed in the following sections.

Image Registration and Parameter Estimation

In some cases, to compare the evidence image and the examined images, they are required to represent the same space. Theoretically, we can select any image as a base image and all other images are projected based on that image. In the experiments here, the evidence image E may be chosen as the base image because its resolution is the lowest.

Figure 3A:
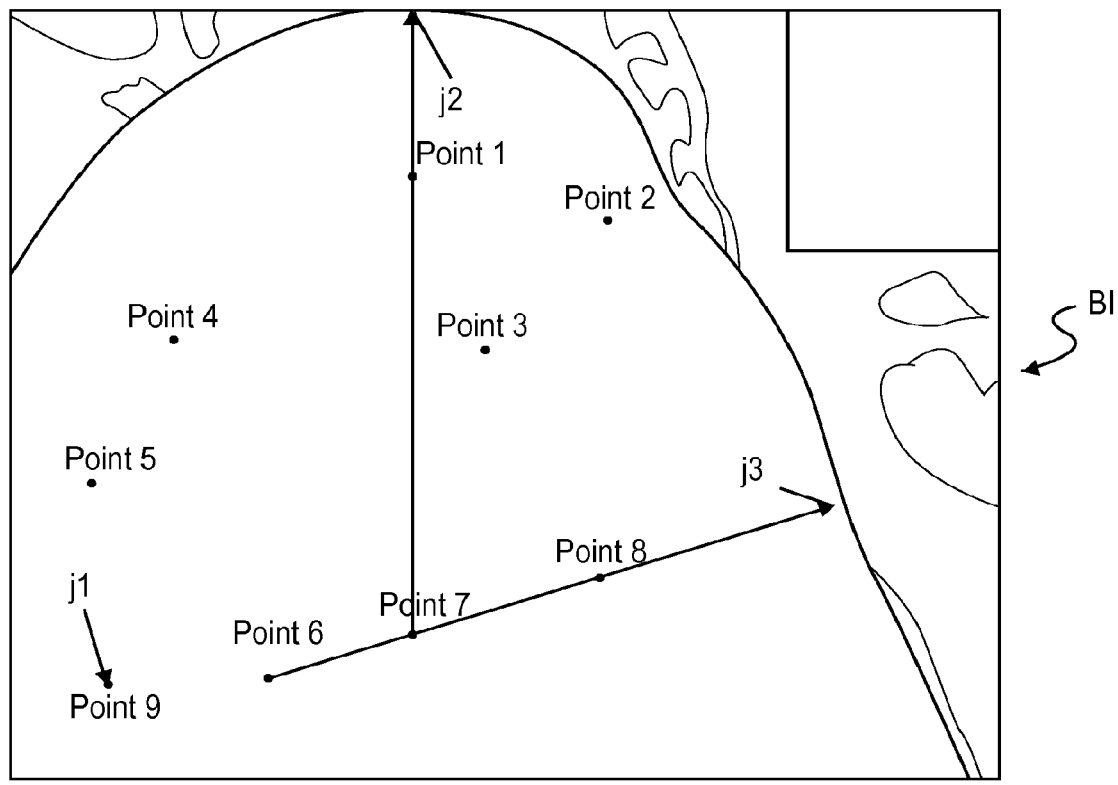
FIGS. 3A-B show a base image, RPPVSMs, and registration points.
Figure 3B:
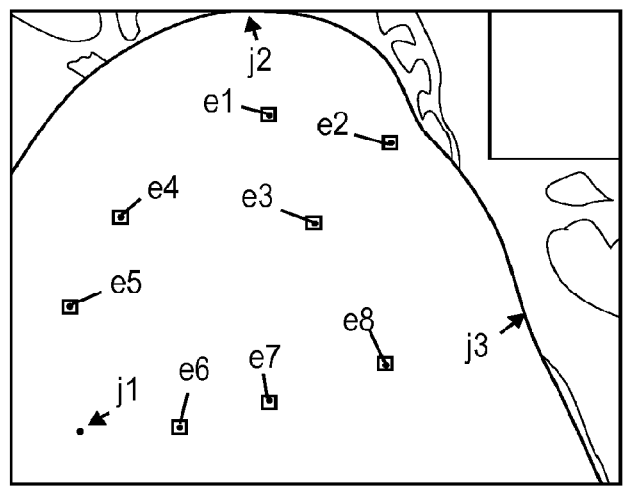

In addition to the selection of the base image, another two variables may be necessary for image registration: 1) a set of correspondence pairs (e.g., for registration of the images) and 2) a transformation model to exploit the established correspondence. Let the correspondence pairs be (($x_{ei}$, $y_{ei}$), ($x_{si}$, $y_{si}$)), where e and s represent the points (e.g., nevi) taken from the evidence image E and an examined image S, and i=1, . . . , d and let the transformation be T. Theoretically, we can choose any point pairs in the evidence image and the examined images as correspondence pairs. However, if the marked nevi or any point very close to them are selected as correspondence pairs for registration, these nevi are no longer useful for matching because the transformation will make artificial match-ups for the correspondence pairs, i.e. ($x_{ei}$, $y_{ei}$)=T($x_{si}$, $y_{si}$) for all i=1, . . . , d. In addition, the distance between the selected correspondence points in the same image should be as large as possible to avoid instability due to extrapolation. Based on these two considerations, three registration points j1-j3 were selected. These registration points in the evidenced image E are shown in FIGS. 3A and 3B as arrowheads j1-j3 in image BI. Specifically, FIGS. 3A-B may show a base image BI, nevi—points 1-8, and registration points at the ends of arrows j1-j3. FIG. 3A may show a confiscated image E with the arrow heads j1-j3 showing the locations of the points for image registration. FIG. 3B may show a confiscated image (e.g., image E) with the arrow heads j1-j3 showing the locations of the points for image registration and the boxes are the identified nevi e1-e8.

One registration point, j1, is the lower end of a vein marked by an expert dermatologist (N.C.) as point 9. The other two registration points j2-3 are on the boundary of the leg. One registration point, j2, is the intersection point of the leg boundary and the line passing through nevus 1 and nevus 7 and the other one registration point, j3, is the intersection point of the leg boundary and the line passing through nevus 6 and nevus 8.

Figures 4E, 4F:
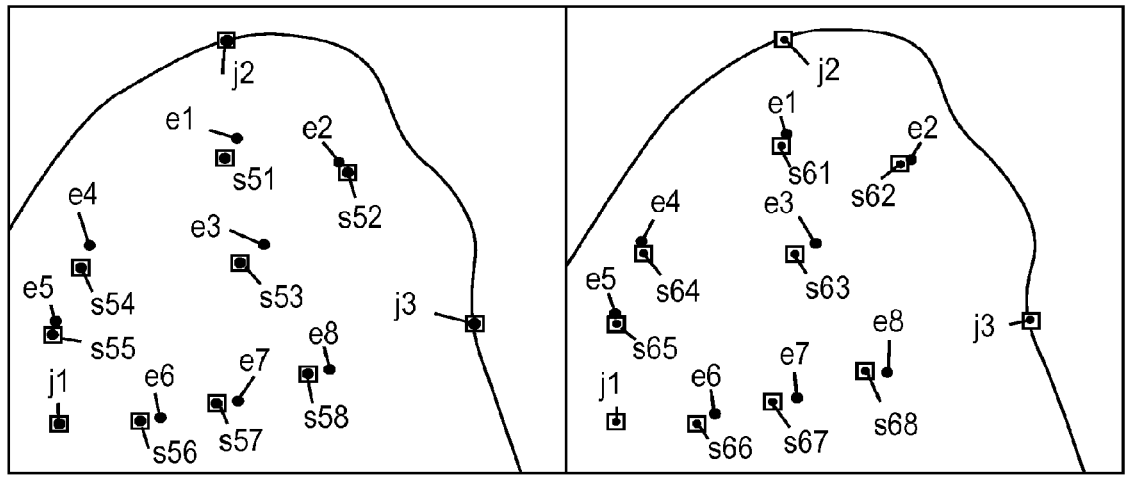
Figures 4G, 4H:
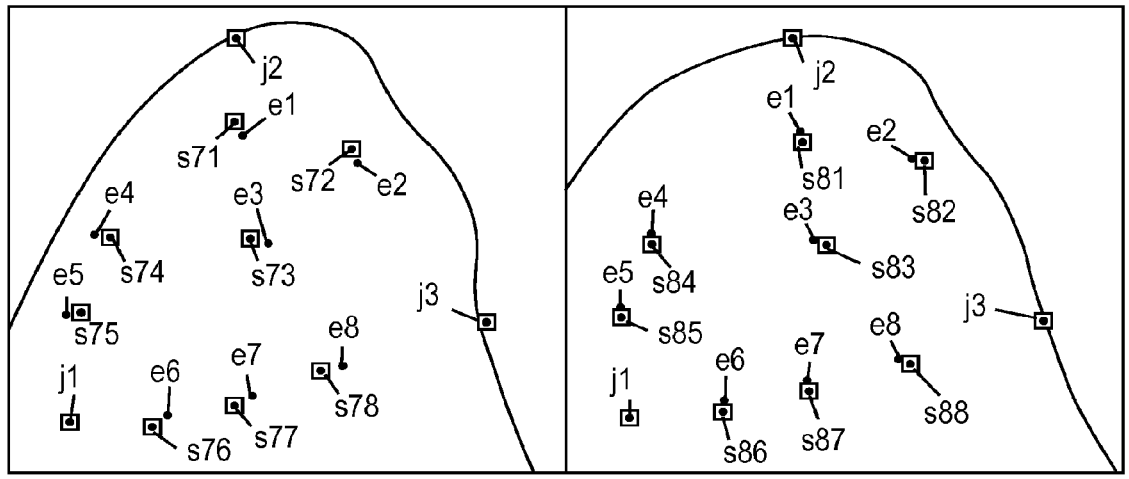

In some cases, there are two types of transformations for image registration. One is the global mapping model and the other is local mapping model. The local approach can handle local deformation, while the global approach compensates only image differences due to view angles and camera position. We use a global transform in this study because it requires less correspondence pairs and the transformation is more understandable. More precisely, we use an affine transform defined as (equation 2):

$$\begin{bmatrix} u \\ v \end{bmatrix} = \begin{bmatrix} a_0 & a_1 & a_2 \\ b_0 & b_1 & b_2 \end{bmatrix} \begin{bmatrix} 1 \\ x \\ y \end{bmatrix} \quad (2)$$

where (u, v) is the transformed coordinate of (x, y) and $$\begin{bmatrix} a_0 & a_1 & a_2 \\ b_0 & b_1 & b_2 \end{bmatrix}$$

is a parameter matrix that can be obtained by solving the three equations, $$\begin{bmatrix} x_{ei} \\ y_{ei} \end{bmatrix} = \begin{bmatrix} a_0 & a_1 & a_2 \\ b_0 & b_1 & b_2 \end{bmatrix} \begin{bmatrix} 1 \\ x_{si} \\ y_{si} \end{bmatrix},$$

where i=1, 2 and 3, in this case. The transformed images are shown in FIGS. 4A-H Specifically, FIGS. 4A-H may show eight second images, nevi, and registration points j1-j3. FIG. 4A-H may show the 8 registered images (A) through (H) from 8 different images (e.g., S1-S8) taken of the suspect's left knee while in custody, such as where S1 is the image PS of FIG. 2 and the S2-S8 are images of the same suspect taken by a process similar to image PS. Images may be taken from different camera angles and different distances from the subject. Each image may also contain the transformed image E having aligned registrations points j1-j3 with the S image. For example, FIG. 4A shows nevi s11-s18 from image S1, nevi e1-8 from image E, and aligned registration points j1-j3 of both images. Similarly, FIGS. 4B to 4H show nevi s21-s28 to s81-s88 (along with nevi e1-8 and aligned registration points j1-j3).

Figure 5:
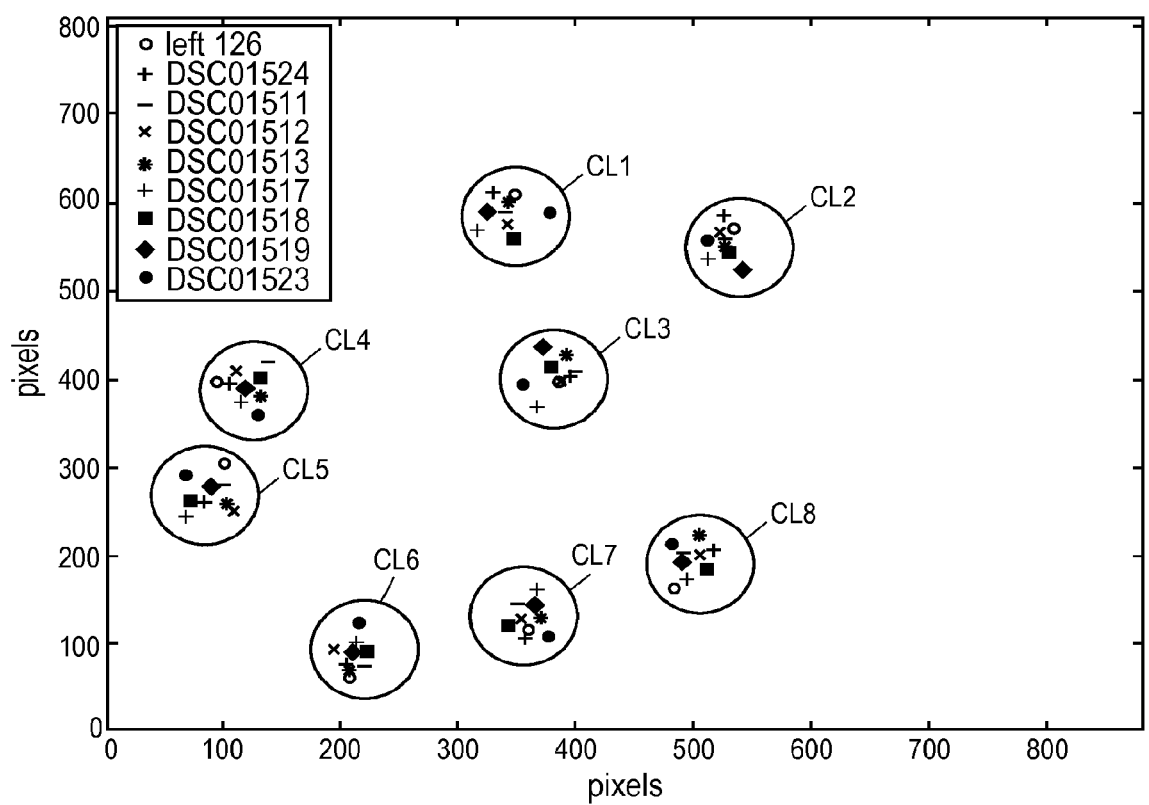
FIG. 5 shows a distribution of RPPVSMs from the first and second images in FIGS. 4A-H, grouped in clusters.

The dots e1-e8 in FIG. 3B are the nevi for matching and the ends of arrowheads j1-j3 are the correspondence points for image registration. In FIGS. 4A to 4H, the dots without square boundary (e.g., e1-e8) are the locations of the nevi from the evidence photo; the black dots with square boundary (e.g., s21-s28 to s81-s88) are the locations of the nevi in the examined images and the ends of the dots with square boundary (e.g. j1-j3) are the three points for image registration (e.g., ends of arrowheads j1-j3). In some cases, all these nevi are plotted in a pixel map in FIG. 5. Specifically, FIG. 5 may show a distribution of nevi from the first and second images of FIGS. 4A-H, grouped in clusters. We can observe clearly eight clusters (CL1-CL8). FIG. 5 may show the distribution of nevi from the evidenced image (open circles—legend "left 126") and the examined images (other 8 symbols) in the same two dimensional space. In some cases, after transformation, all images can be analyzed in pixels rather than traditional measurements.

Figure 6:
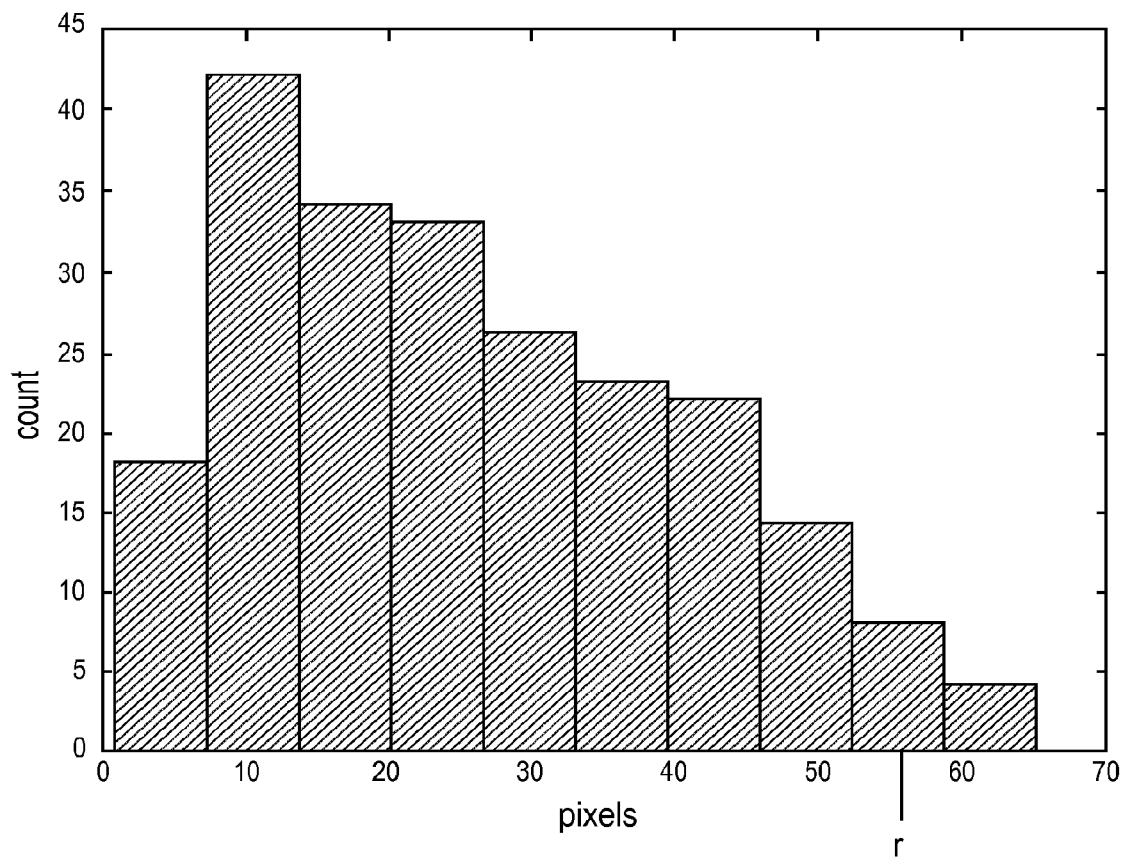
FIG. 6 shows a histogram of the corresponding RPPVSMs distance differences in the images represented in FIGS. 4A-H.

In some embodiments, to calculate the probabilities of nevus pattern correspondence, we will estimate the parameter A, r and p. Since p depends on r, we may only need to estimate A and r. Counting the number of overlapped skin pixels in the two dimensional space, we can obtain the value A. We set the smallest value of r for which (equation 3):

$$Pr(\sqrt{(x_1-x_2)^2+(y_1-y_2)^2} \leq r) \geq 0.975, \quad (3)$$

where ($x_1$, $y_1$) and ($x_2$, $y_2$) are two corresponding nevi in the training images (FIGS. 4A to 4H). In some cases they may be described as two corresponding nevi from the same person in a given training database. Specifically, FIG. 6 may show a histogram of the corresponding nevi distance differences in the images represented in FIGS. 4A-H. The histogram of $\sqrt{(x_1-x_2)^2+(y_1-y_2)^2}$ obtained from the training images is shown in FIG. 6. Finally, in this case, r is set to 55.24 pixels to capture 97.5% of the corresponding matched nevus to nevus distances.

Experimental Results Using Calculated Parameters

Using the Equation 1 and the parameters calculated above, we can then calculate the nevus pattern correspondence probabilities between the evidence image and the images taken from the suspect. These probabilities are listed in Table 3.

TABLE 3

Correspondence probabilities of the nevus patterns from evidence image and the nevus patterns from the suspect.

| | N | m | p | A | P(A, C, n, m, p) |
|---|---|---|---|---|---|
| Evidence image vs image | 8 | 8 | 8 | 448443 | 3.3135e−009 |
| Evidence image vs image | 8 | 8 | 8 | 484380 | 1.7019e−009 |
| Evidence image vs image | 8 | 8 | 8 | 429142 | 4.8561e−009 |

TABLE 3-continued

Correspondence probabilities of the nevus patterns from evidence image and the nevus patterns from the suspect.

| | N | m | p | A | P(A, C, n, m, p) |
|---|---|---|---|---|---|
| Evidence image vs image | 8 | 8 | 8 | 416373 | 6.3190e−009 |
| Evidence image vs image | 8 | 8 | 8 | 413028 | 6.7802e−009 |
| Evidence image vs image | 8 | 8 | 8 | 468949 | 2.2502e−009 |
| Evidence image vs image | 8 | 8 | 8 | 467624 | 2.3059e−009 |
| Evidence image vs image | 8 | 8 | 8 | 457940 | 2.7634e−009 |

Using the worst comparison, these images still suggest there is a less than 1.0e-09 chance that these two images are from different people. This chance means there is an extremely high likelihood that these nevus patterns are from the same person.

Discussion

The above example focuses on identification of nevi on a Caucasian man's leg. However, the current technology does not depend on the absolute diagnosis of these lesions as nevi. We introduce here the novel class of skin marks called, "relatively permanent vascular or pigmented skin marks" or RPPVSMs. This concept encompasses all pigmented or vascular skin lesions that will satisfy the three conditions of a hard biometric trait for the purposes of suspect identification. In this way, the discussion of absolute certainty of the clinical diagnosis receives less import. Rather, an expert classifies something as an RPPVSM based on the clinical characteristics, but need not try to defend his or her position that they are absolutely sure each and every identified lesion is a nevus (for example). A board-certified dermatologist can not be 100.0% certain that any given RPPVSM is a nevus (mole), a seborrheic keratosis, an ephilide (freckle) or a lentigo (liver spot), but can be quite certain that any given pigmented lesion is within this class. Cherry hemangiomas are red lesions that can be easily identified by a dermatologist. Thus, RPPVSMs are well demarcated, pigmented or vascular lesions that are randomly distributed on the body, unique to individuals, and change quite slowly over the period of years. The pattern of these lesions, to the best of our knowledge, is not determined by genetics, but by stochastic environmental events which leads to random patterning on the body surface. However, it is the accepted community medical practice, that a board certified-dermatologist is capable of identifying this class of lesions clinically to a high degree of certainty. The practice of dermatology dictates that such experts in the skin are capable of identifying different types of melanocytic and vascular skin lesions including the class of RPPVSMs. This practice is very reproducible.

Using this methodology, it is clear that nevus pattern correspondence is capable of identifying individuals with a high degree of certainty. Under the right circumstances, this technology approaches or surpasses fingerprint technology for positive identification certainty. Importantly, it also has the benefit of easy collectability from the growing mountain of evidence already collected by law enforcement agencies from digital media cybercrimes such as child pornography.

In addition, it is considered that embodiments described herein for identification of a person based on nevi patterns in images can be applied to other types of RPPVSMs that form patterns in images. For instance, one single other type of RPPVSM can be considered on its own; multiple other types of RPPVSMs can be considered mixed together; or one or more other types of RPPVSMs can be considered mixed together with nevi to form patterns in images for identification of a person as described herein. The use of nevi, and/or other types of RPPVSMs mentioned herein may be generally described as using RPPVSM patterns for identification of a person.

Figure 7:
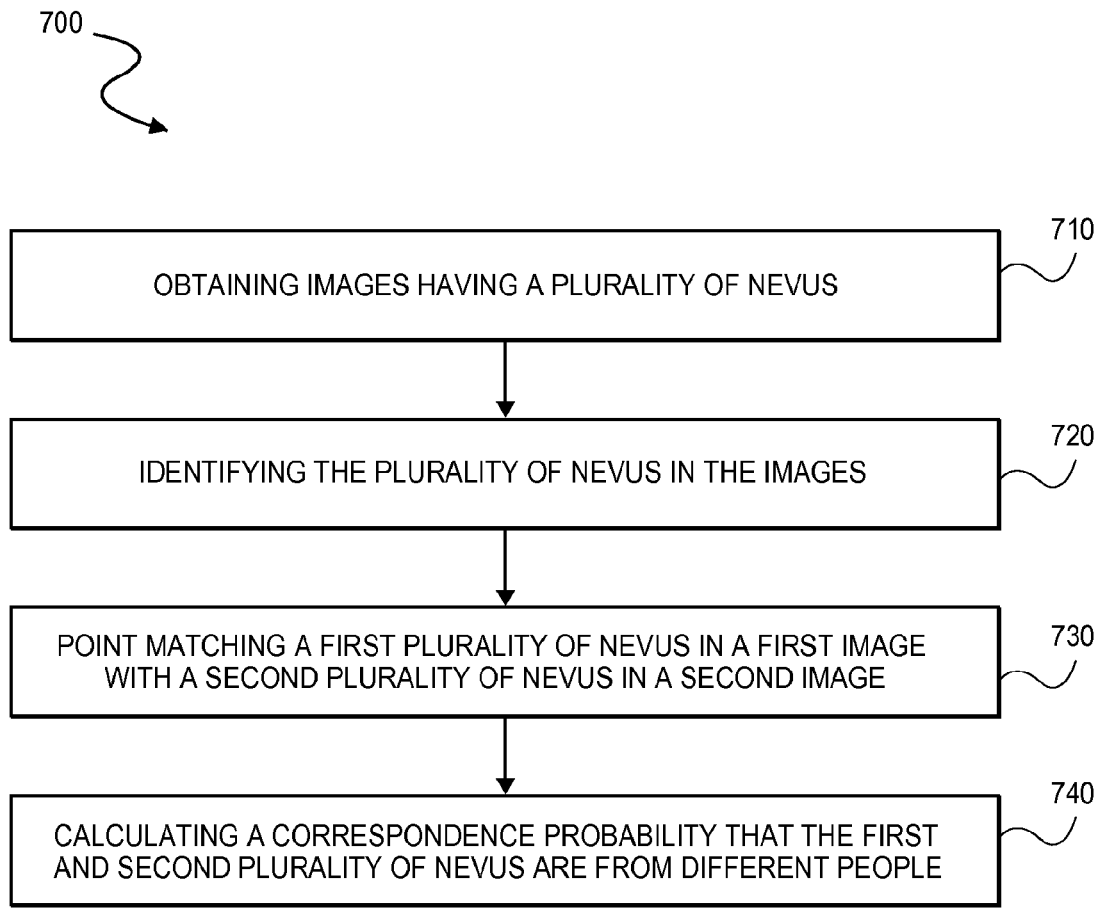
FIG. 7 shows a flow diagram of a process for identifying a person based on relatively permanent pigmented mark patterns in images.

FIG. 7 shows a flow diagram of an example of a process 700 for identifying a person based on RPPVSM patterns in images. Process 700 may include any of the processes described with respect to FIGS. 1-6 and 8.

At block 710 images having a plurality of RPPVSM are obtained or received. Block 710 may include obtaining the first image and creating the second image(s). For instance the first image may be one image obtained from evidence of a crime; and the second image may be one or more images obtained from a suspect of the crime (e.g., by taking pictures of the suspect, such as after arrest of the suspect). This represents the equivalent of comparing a latent fingerprint found at a crime scene with the fingerprint of a suspect taken while in custody. The S images may be medical images taken by a medical expert (e.g., dermatologist), criminal expert (e.g., law enforcement photographer), or forensic expert. Although the example of FIGS. 1-6 above had one E image and eight S images it can be appreciated that there can be 2, 3, or more E images. Similarly, there can be fewer or more than eight S images, such as 6, 7, 9, 10, 12 or more.

In some cases, the first image and second image are of the same person, however that may not be apparent from just looking at the images without point matching. According to some embodiments, the first and second images are taken at different locations and times. For instance the first image may have been taken during a crime (e.g., sexual assault or other crime) and taken prior to the second image. The first image may be taken at one setting or in one building, while the second image is subsequently taken at another setting or in another building. The first may be taken at one point in time and the second taken at least a day, a week, a month, a year later, or years later.

At block 720 plurality of RPPVSM are identified in the obtained images. Block 720 may include a medical expert or practitioner identifying the plurality of RPPVSM in the images (e.g., see FIGS. 1-2). In some cases, a computational approach may be used to detect RPPVSMs. In fact, both approaches may be used to "double check" accurate identification of RPPVSMs. For instance, a dermatologist or other MD may view the images on a display (e.g., display 805) and mark the RPPVSM locations on the image. Those locations may then be stored in a computer memory (e.g., storage 861 and/or 820) to perform identifying a person as described herein.

In some cases, the first plurality of RPPVSMs may be on a first area skin of a person in the first image, and the second plurality RPPVSMs may be on a second area of skin of a person in the second image. The first area may be approximately equal in location on the person, and in size to the second area. In some cases, they may be within 2, 5, 10 or 20 percent location center and size.

At block 730 a first plurality of RPPVSMs in a first image are point matched with a second plurality of RPPVSMs in a second images. Block 730 may include image registration; parameter estimation; and transforming and translating the images (e.g., x/y coordinates of locations in the images).

In some cases, image registration; parameter estimation includes selecting a base image; selecting in the base image, registration points for the images; and (e.g., linearly or non-linearly) transforming the images and translating the images to align the registration points of all of the first and second images (e.g., see FIG. 4). Selecting a base image comprises selecting an image with the lowest resolution or number of pixels. Selecting the registration points may include selecting RPPVSMs (e.g., identified by a medical expert) that are not being evaluated, selecting points at a boundary of an area of skin that the RPPVSMs of an image are within, selecting points with a larger distance between them than between any two adjacent RPPVSMs of the image, and/or selecting at least two (or selecting 3) registration points. Some embodiments may match nevi; and may use nevi and other RPPVSMs to identify image registration points (e.g., see FIGS. 3A-B).

Also, transforming and translating may include one of a global transformation, an Affine transformation, a combined transformation for all images, a transformation using a parameter matrix (A) and a vector (b) where x→Ax+b. Transforming and translating may include preserving co-linearity relation between the registration points; and preserving ratios of distances along lines between the registration points. Specifically, linearly transforming and translating the images may include calculating parameter matrix A and vector b using equation 2 above. According to some embodiments, other transforms (e.g., non linear transform) can also be used (e.g., instead of a linear transform). For example, such transforms may include a thin plate spline transform, non-rigid transform.

At block 740 a correspondence probability that the first and second plurality of RPPVSM are from different people is calculated (e.g., which may also provide a probability that they are from the same person). Block 740 may include calculating a correspondence probability based on point matching of block 730. As such, blocks 730 and 740 may be co-dependent, such as where parameter and thresholds for block 730 (e.g., for image registration; parameter estimation; and transforming and translating the images) are considered or used in block 740.

According to embodiments, calculating the correspondence probability may include calculating equation 1 above. For instance, calculating the correspondence probability may include identifying clusters of possible matching RPPVSMs of the images; estimating parameter A=the size of overlapped total skin area of the RPPVSMs considered for matching in the images, parameter r=the distance threshold between two nevi for the RPPVSMs to be considered matching, and parameter p the number of matching RPPVSMs of the images; and calculating the correspondence probability using equation 1 above.

After transforming and translating the images, clusters of possible matching RPPVSMs may be identified using a combined plot of the first and second plurality of RPPVSMs (e.g., see FIG. 5). Parameter A may be estimated by counting the pixels or area of overlap of the first and second area of skin in the images where the RPPVSMs considered for matching exist. Estimating r may include selecting a value of r for which Pr the probability of genuine correspondence of any two RPPVSMs of the clusters is a selected threshold. Here, Pr may be the probability that two genuine corresponding nevi are from the same person. In some cases the threshold may be based on a histogram of corresponding RPPVSMs distance differences between RPPVSMs in a cluster of pixels and the distance r. For example, in some cases, r may be set to a distance or number of pixels to capture (e.g., match) 97.5% of the corresponding matched RPPVSMs distances. Other thresholds may be used such as 95%, 98%, or 99%. Calculating r may include using a histogram of corresponding RPPVSMs distance differences in the images (e.g., see FIG. 6).

In some cases where there are not a significant number of comparison images, r may be set by alternative methods to obtain an estimated probability based on prior knowledge. In situations where only one image from evidence and one image from custody (e.g., the suspect) are compared, r may be used based on prior comparisons for the suspect, and/or images of another person. This may help ensure that r is not too large (e.g., 5 cm) and is more relevant to estimate the comparison probabilities.

In some situations, a custody image may not be available. For instance in a situation matching two evidence images from the same or different crime scenes; or where an attempt is made to link up criminals/suspects in different legal cases (e.g., based on one or more evidence images from different evidence locations or two separate child pornography sets of images captured from different computers). To set r for this case, the imaging condition in the crime scenes can be simulated by using (e.g., as taken with a camera) many images from a different person/subject (not related to the cases). If the subject does not have a sufficient number of PRRVSM, some markers can be put on the persons skin, and these markers considered as artificial RPPVSMs. Then, the histogram (e.g., FIG. 6) can be computed to calculate the r.

Also, P may be calculated based on r, because P is the number of matching RPPVSMs (e.g., given the clusters) and r is the distance between RPPVSMs considered matching. In some cases, estimating A and r comprises using equation 3 above.

Block 740 may also include determining whether the calculated probability satisfies the threshold probability for uniquely identifying a person. Also, some embodiments of process 700 exclude blocks 710 and 720, such as where the images are already available and the RPPVSMs are already identified (e.g., at system 800), and only blocks 730 and 740 are performed in the process of identifying a person.

Figure 8:
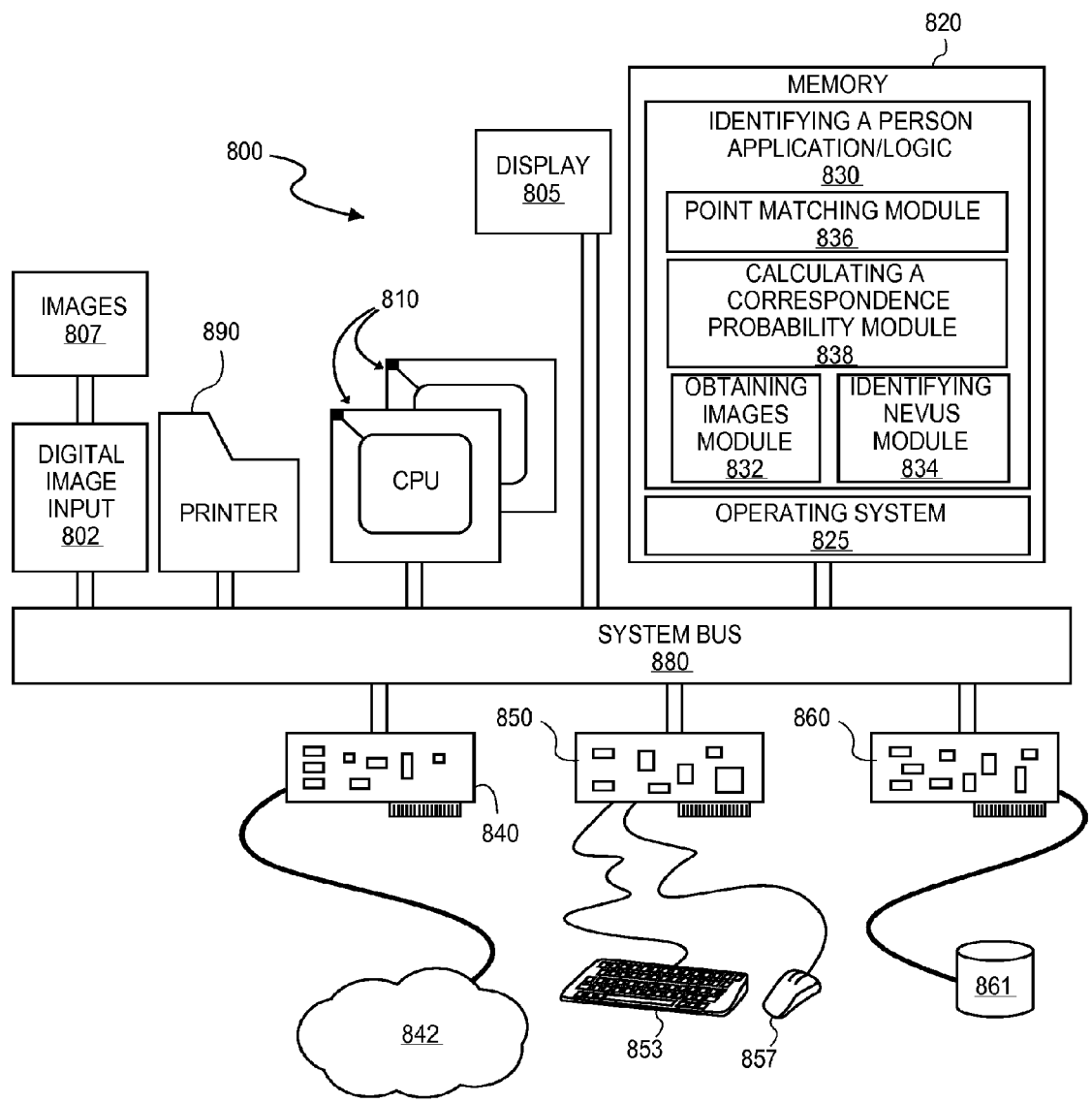
FIG. 8 shows computer systems coupled to a digital data input.

FIG. 8 shows computer system 800 coupled to a digital image input 802. Process 700, and/or any of the processes described above with respect to FIGS. 1-7 may be performed by system 800.

Computer system 800 may be a computer, a computing system, a desktop computer, a secured computer, a portable computer, a laptop computer, a hand held computer, a cellular phone, a client computer, a server computer, and the like. Computer system 800 may be a digital processor device having the components described for FIG. 8. Input 802 may include any combination of, or all of the following: a digital memory device, a portable digital memory device, a USB device, a flash drive, a disc drive, a digital still frame camera, a digital video camera, and/or a port for any of the above devices.

Computer system 800 has a group of instructions and data which may be stored on a mass storage device 861 (e.g., a hard disk drive). These instructions and data are to cause a programmable processor to implement a process or method according to an embodiment. The data may be a copy of digital images 807, which may be obtained (e.g., received from or at) digital image input 802. Digital images 807 may be a first and second image as described herein. The instructions may be executable computer software, which may be obtained (e.g., received from or at) digital image input 802, or otherwise as known in the industry. The instructions may be an embodiment that satisfies the description "a computer-readable medium storing data and instructions to cause a programmable processor to perform operations" as described herein. If system 800 executes those instructions, it may perform a method according to the embodiments.

System 800 may or may not be connected to a distributed data network 842 (optional) such as the Internet, an intranet, a LAN, a GAN, etc. Digital images 807 may be obtained (e.g., received from or at) data network 842. In some cases, network 842 may be a secure network, or may not exist for system 800.

Input 802 (or network 842) may receive and provide to computer 800 (e.g., for storage in memory 861) a first image (e.g., one or more image(s) E) from a portable digital memory device, a USB device, a flash drive, and/or a disc drive. Thus, the first image may be stored in memory 861 for processing by CPU 810 for identifying a person based on relatively permanent pigmented mark patterns in images. CPU may represent one or more computer processors as known in the art.

Also, input 802 (or network 842) may receive and provide to computer 800 (e.g., for storage in memory 861) a second image (e.g., one or more image(s) S) from a digital still frame camera, a digital video camera, a portable digital memory device, a USB device, a flash drive, and/or a disc drive. Thus, the second image may be stored in memory 861 for processing by CPU 810 for identifying a person based on RPPVSMs patterns in images.

The first and/or second image may be one or more (e.g., two interlaced frames combined) images or frames from a video. The images or frames may be "separated" from a video (captured or otherwise parsed out of the video) for identifying a person as described herein. The images or frames may be separated from video prior to being stored in memory 861; or may be separated from video data stored in that memory. In some cases, the images or image data may be analog data that has been digitized.

Descriptions above for receiving and providing images to computer 800 (e.g., from input 802 or network 842) may include or correspond to block 710 of FIG. 7.

FIG. 8 shows other components and subsystems of a computer system 800 that implements an embodiment. Central processing units (CPUs) 810 are programmable processors that execute according to instructions and data in application/logic 820 to perform the mechanisms described herein. Application/logic 820 may include portions containing data and instructions to implement an operating system ("OS") 825 and identifying a person application/logic 830 incorporating an embodiment. Application/logic 820 may be or may include RAM memory (as well as application/logic 830).

Identifying a person application/logic 830 may include two or more different modules as described herein, such as obtaining images module 832 (optional), identifying nevus module 834 (optional), point matching module 836, and calculating a correspondence probability module 838. These modules may identify a person as described herein based on images 802. Application/logic 830 and these modules may include software instructions or applications; and/or hardware logic. The logic may represent computer hardware, software, instructions, instructions stored in RAM, instructions stored in main memory, instructions stored in ROM, instructions stored in BIOS, or a special purpose computer for identifying a person as described herein. In some cases system 800 requires digital input 802, application/logic 830, and storage device 861 (which may include a secure database of suspect images).

Obtaining images module 832 may control or cause images to be obtained as described for block 710 of FIG. 7; and/or received as described for input 802 and network 842. Identifying RPPVSMs module 834 may control or cause RPPVSMs to be identified as described for block 720 of FIG. 7. Point matching module 836 may control or cause point matching of nevi of images as described for block 730 of FIG. 7. Also, calculating a correspondence probability module 838 may control or cause correspondence probability to be calculated as described for block 740 of FIG. 7. These modules may identify a person as described for FIGS. 1-7.

Input/output 840 may include a network adapter to support communications with other systems via distributed data network 842. Another interface adapter 850 may facilitate coupling the system to user interface devices such as display 805, printer 890 (optional), keyboard 853 and mouse 857. In many systems, user interface devices are connected to a built-in controller, rather than to a "plug in" expansion card.

Mass storage interface 860 permits the system to store data on mass storage device 861, such as a hard disk. Thus, for example, data from data input 802, network 842, and/or modules of application/logic 830 may be stored on device 860 during or after point matching RPPVSMs, calculating a correspondence probability, and/or identifying a person as described herein. These and other components and subsystems of the computer system are connected to, and exchange data and control signals via, a system bus 880.

In some embodiments, in response to or after point matching RPPVSMs, calculating a correspondence probability, and/or identifying a person as described herein, system 800 may send a match (e.g., the calculated correspondence probability is within a preselected acceptance threshold of possible error) or rejection signal or report (e.g., the calculated correspondence probability is not within the threshold) to display 805, printer 890, and/or another computing system via network 842. The threshold or report may be based on requiring the correspondence probability for uniquely identifying a person.

In some cases, system 800 may include circuitry specially constructed for the required purposes, and/or it may comprise a special (or general) purpose computer selectively activated or specially configured by a computer program stored in the computer. Such a computer program (e.g., program instructions) may be stored in a computer readable (e.g., non-volatile) storage medium, such as, but not limited to, any type of disk including floppy disks, optical disks, compact disc read-only memory ("CD-ROM"), and magnetic-optical disks, read-only memories ("ROMs"), erasable programmable read-only memories ("EPROMs"), electrically-erasable read-only memories ("EEPROMs"), flash memories, magnetic or optical cards, or any type of media suitable for storing electronic instructions. System 800 includes processor 810 coupled to the storage medium to execute the stored instructions. The processor may also be coupled to a volatile memory (e.g., RAM, such as part of application/logic 820) into which the instructions are loaded from the storage memory (e.g., non-volatile memory) during execution by the processor. The processor and memory(s) may be coupled to receive images from various sources (e.g., images 807, input 802 and network 842) to perform point matching nevi, calculating a correspondence probability, and/or identifying a person as described herein (e.g., as noted above for FIGS. 1-7). Use of and/or operations performed by system 800 may be described as a machine implemented means or method.

Further embodiments of the invention are now explained, such as using FIGS. 9-14. In some embodiments, the process of FIG. 7, and/or the device of FIG. 8 may be used to perform the embodiments of FIGS. 9-14.

A RPPVSM Individuality Model

According to embodiments, a RPPVSM individuality study is performed. Embodiments of an RPPVSM individuality study may focus on the middle to low density RPPVSM patterns which qualified the Complete Spatial Randomness CSR hypothesis because their statistical properties could be accurately modeled. Both empirical and theoretical approaches were used in this study. In the empirical approach, RPPVSM random correspondences were generated by matching RPPVSM patterns from different subjects. In the theoretical approach, probabilities of random correspondence (PRC) were computed using a statistical point matching model which assumes that RPPVSMs are independently and uniformly distributed. Finally, the model was evaluated by comparing the theoretical results to the empirical results.

The following assumptions may be employed in the individuality model. For example, all or some of the assumptions may be employed:

1) Only RPPVSM location was considered for matching. Other features such as type, color, and size were ignored.
2) The locations of RPPVSMs followed an independent and uniform distribution.
3) The locations of RPPVSMs could not be too close to each other. Two RPPVSMs were considered too close if their distance was less than or equal to $r_0$, where $r_0$ was a tolerance distance. To realize this assumption, distance check was performed before matching. Two RPPVSMs whose distance was shorter than $r_0$ were merged as one RPPVSM. The merging operation was performed by sorting the RPPVSMs in the x-axis direction. Then, the first RPPVSM was kept for matching while the other was removed.
4) There was one and only one correct alignment between an input pattern and a template pattern. Partial matching was not considered since it might result in multiple correct alignments.
5) Each RPPVSM in the input pattern could match one and only one RPPVSM in the template pattern and vice versa. To realize this assumption, if two RPPVSMs were matched to the same correspondence RPPVSM, the two RPPVSMs were considered as one RPPVSM.
6) A correspondence between two RPPVSMs from different persons was an independent event.
7) Each correspondence was equally important. Correspondences in the peripheral area were weighted equal to those in the center area.
8) Only positive correspondences were considered. Conflicting evidence (i.e., a RPPVSM in the input pattern does not correspond to any RPPVSM in the template pattern) was not considered.
9) The quality of all images was equally good for manual RPPVSM detection. A salient feature labeled as a RPPVSM in the first image had a correspondence in the second image and vice versa. Only RPPVSM location was considered for matching. Other features such as type, color, and size were ignored.

One objective is to compute the probability that, given an input pattern with n RPPVSMs, any arbitrary (template) pattern with m RPPVSMs from a different person will have exactly p correspondences with the input pattern. The correspondences are established as follow. Taking only RPPVSM locations as the feature for matching, an input pattern I and a template pattern T can be defined as (equations 4-5):

$$I = \{(x_{i1}, y_{i1}), (x_{i2}, y_{i2}), \ldots (x_{in}, y_{in})\}, \quad (4)$$

$$T = \{(x_{t1}, y_{t1}), (x_{t2}, y_{t2}), \ldots (x_{tm}, y_{tm})\}. \quad (5)$$

Assuming that I and T have been aligned, correspondence point pairs should be located near each other. A correspondence between the $a^{th}$ RPPVSM in the input pattern and the $b^{th}$ RPPVSM in the template pattern is established if and only if (equation 6):

$$\sqrt{(x_{tb} - x_{ia})^2 + (y_{tb} - y_{ia})^2} \leq r_0, \quad (6)$$

where $r_0$ is a tolerance distance. Even when two aligned patterns are from the same subject, the correspondence points may slightly deviate from one another due to local variations in the patterns. The parameter $r_0$ is introduced to accommodate these intra-class variations.

Figure 9:
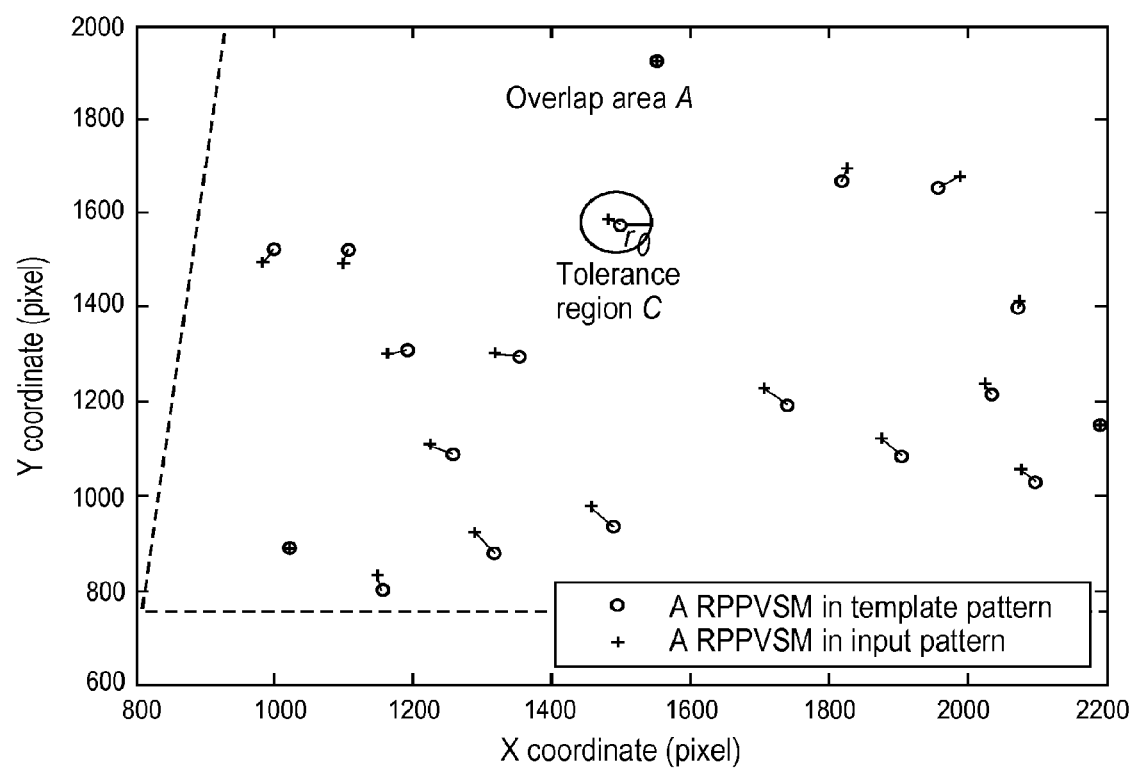
FIG. 9 shows an illustration of the overlap area A and the tolerance region C in aligned input and template RPPVSM patterns.

FIG. 9 shows an illustration of the overlap area A and the tolerance region C in aligned input and template RPPVSM patterns. The established correspondences are shown connected by lines. FIG. 9 illustrates a genuine match, where all correspondence pairs can be identified. Each correspondence pair is connected by a line, and each input RPPVSM is within the tolerance region $C = \pi r_0^2$ of its correspondence template RPPVSM. The dashed line area indicates the overlap area A between the input and the template patterns after alignment.

Now we present an embodiment of a model for estimating the probability of random correspondence. Let $d = \sqrt{(x_t - x_i)^2 + (y_t - y_i)^2}$ be the Euclidean distance between any two arbitrary points $(x_i, y_i)$ and $(x_t, y_t)$ in the input and template patterns, respectively. The locations of the input and template RPPVSMs are independent, because they are from different subjects. Thus, the probability that $(x_i, y_i)$ falls within the tolerance region of $(x_t, y_t)$, i.e., $d \leq r_0$ is (equation 7):

$$Pr(d \leq r_0) = \frac{\pi r_0^2}{A} = \frac{C}{A}. \quad (7)$$

If an input pattern has two RPPVSMs and a template pattern has m RPPVSMs, the probability that the first input RPPVSM has a correspondence with one of the m template RPPVSMs is $$\frac{mC}{A},$$

and the probability that the second input RPPVSM does not have a correspondence is $$\frac{A - mC}{A - C}.$$

Thus, the probability that there is exactly one correspondence (and one non-correspondence) between the two patterns is given by (equation 8):

$$Pr(A, C, m, 2, 1) = 2 \times \frac{mC}{A} \times \frac{A - mC}{A - C}. \quad (8)$$

The probability is multiplied by 2 since two scenarios are possible—the first input RPPVSM has a correspondence but the second input RPPVSM does not have a correspondence, or vice versa.

Extending the scenario to an input pattern with n RPPVSMs, the probability that exactly one input RPPVSM has a correspondence with one of the m template RPPVSMs can be calculated as the probability of having one correspondence multiplied by the probability of having no other correspondences. Thus, if the input pattern has n RPPVSMs and the template pattern has m RPPVSMs, the probability of obtaining exactly one correspondence is (equation 9):

$$Pr(A, C, m, n, 1) = \binom{n}{1} \times \left(\frac{mC}{A}\right) \times \left(\frac{A-mC}{A-C}\right) \quad (9)$$

$$\left(\frac{A-(m+1)C}{A-2C}\right) \cdots \left(\frac{A-(m+((n-1)-1))C}{A-(n-1)C}\right).$$

Now we generalize the model for the scenario with more than one correspondence. Given an input pattern with n RPPVSMs and a template pattern with m RPPVSMs, the probability that there are exactly p correspondences, where $p \in \{0, 1, \ldots \min(m,n)\}$, is $$\left(\frac{mC}{A}\right)\left(\frac{(m-1)C}{A-C}\right)\left(\frac{(m-2)C}{A-2C}\right) \cdots \left(\frac{(m-(p-1))C}{A-(p-1)C}\right),$$

and the probability that the remaining n-p points do not have correspondences is $$\left(\frac{A-mC}{A-pC}\right)\left(\frac{A-(m+1)C}{A-(p+1)C}\right)\left(\frac{A-(m+2)C}{A-(p+2)C}\right) \cdots \left(\frac{A-(m+((n-p)-1))C}{A-(n-1)C}\right).$$

Combining both terms together, the probability that there are exactly p correspondences and n-p non-correspondences becomes (equation 10):

$$Pr(A, C, m, n, p) = \binom{n}{p} \times \left(\frac{mC}{A}\right)\left(\frac{(m-1)C}{A-C}\right)\left(\frac{(m-2)C}{A-2C}\right) \cdots \quad (10)$$

$$\left(\frac{(m-(p-1))C}{A-(p-1)C}\right) \times \left(\frac{A-mC}{A-pC}\right)\left(\frac{A-(m+1)C}{A-(p+1)C}\right)$$

$$\left(\frac{A-(m+2)C}{A-(p+2)C}\right) \cdots \left(\frac{A-(m+((n-p)-1))C}{A-(n-1)C}\right).$$

Let M=[A/C], where [ ] represents an operator of rounding to the nearest integer. Since A>>C, M≈A/C. Dividing all numerators and denominators by C, Eq. 10 can be written as (equation 11):

$$Pr(M, m, n, p) = \quad (11)$$

$$\binom{n}{p} \times \left(\frac{m}{M}\right)\left(\frac{m-1}{M-1}\right)\left(\frac{m-2}{M-2}\right) \cdots \left(\frac{m-(p-1)}{M-(p-1)}\right) \times \left(\frac{M-m}{M-p}\right)$$

$$\left(\frac{M-(m+1)}{M-(p+1)}\right)\left(\frac{M-(m+2)}{M-(p+2)}\right) \cdots \left(\frac{M-(m+((n-p)-1))}{M-(n-1)}\right).$$

Eq. 11 can be written as (equation 12):

$$Pr(M, m, n, p) = \quad (12)$$

$$\binom{n}{p} \times \left(\frac{m}{M}\right)\left(\frac{m-1}{M-1}\right)\left(\frac{m-2}{M-2}\right) \cdots \left(\frac{m-(p-1)}{M-(p-1)}\right) \times \left(\frac{M-m}{M-p}\right)$$

-continued $$\left(\frac{M-m-1}{M-(p+1)}\right)\left(\frac{M-m-2}{M-(p+2)}\right) \cdots \left(\frac{(M-m)-((n-p)-1)}{M-(n-1)}\right).$$

It can be further written in a factorial form as (equation 13):

$$Pr(M, m, n, p) = \quad (13)$$

$$\frac{n!}{p!(n-p)!} \times \frac{(M-n)!}{M!} \times \frac{m!}{(m-p)!} \times \frac{(M-n)!}{((M-m)-(n-p))!},$$

which finally reduces to the following hypergeometric distribution (equation 14):

$$Pr(M, m, n, p) = \frac{\binom{m}{p}\binom{M-m}{n-p}}{\binom{M}{n}}. \quad (14)$$

Based on the statistical results previously calculated, this individuality model is suitable for RPPVSM since the independently and uniformly distributed assumption fits the empirical distribution of RPPVSMs in middle to low density patterns.

A RPPVSM Matching

According to embodiments, a RPPVSM matching is performed. Embodiments of a RPPVSM matching method may involve registering an input pattern to a template pattern and establishing correspondences based on a tolerance distance $r_0$. There may be two types of transformations for image registration. One may be the global mapping model and the other is the local mapping model. The former applies the same transformation to the whole image while the latter allows local variations. Since the images used in this study were taken in a standard pose, local variations were very small and thus could be ignored. Major variations came from camera's position, zoom factor, and view angle, which can be handled by rotation, scale, and translation operations. Therefore, an affine transformation, which is a global mapping model, was selected to handle the registration process.

Figure 10B:
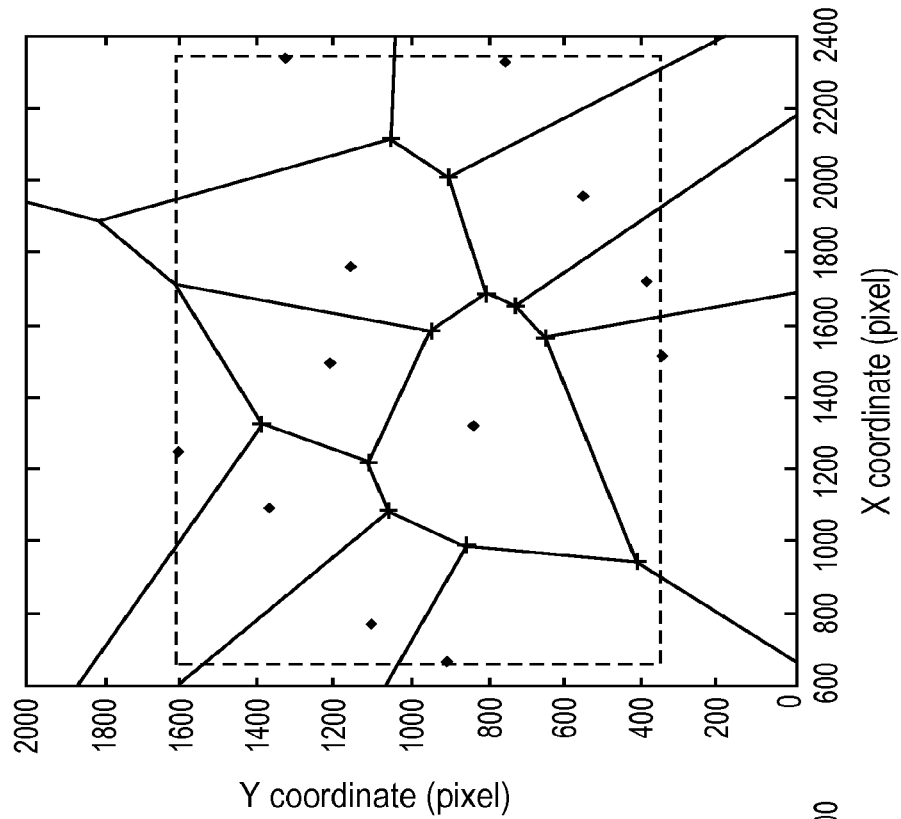
FIGS. 10A-F show a process to generate registration points from a pattern of RPPVSMs.
Figure 10A:
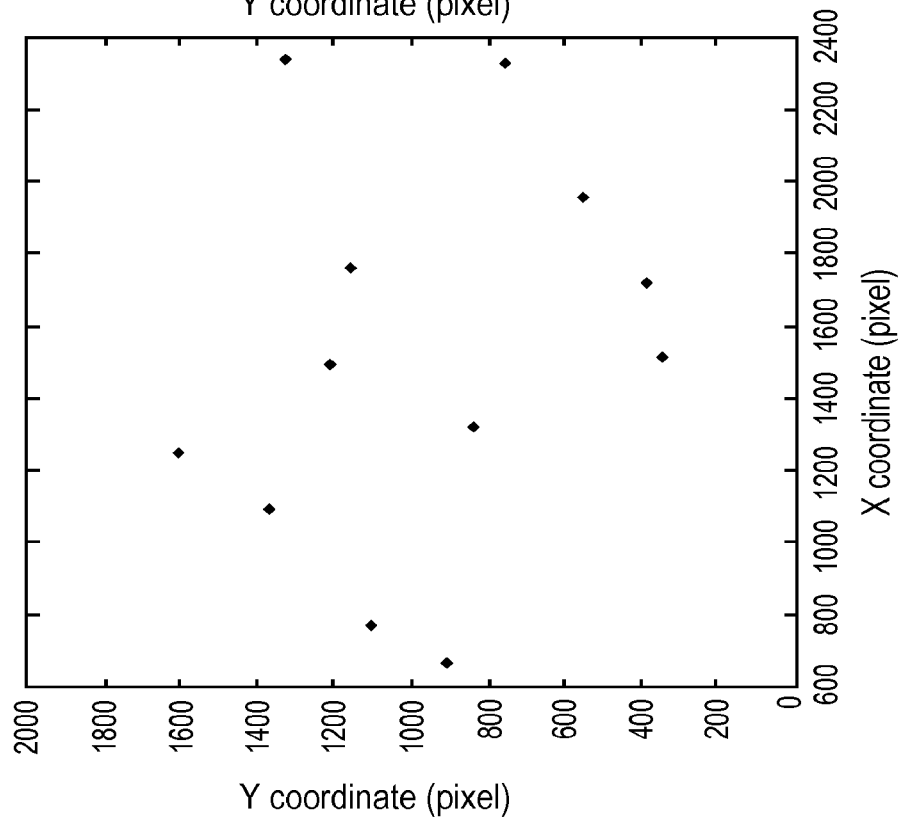
Figure 10D:
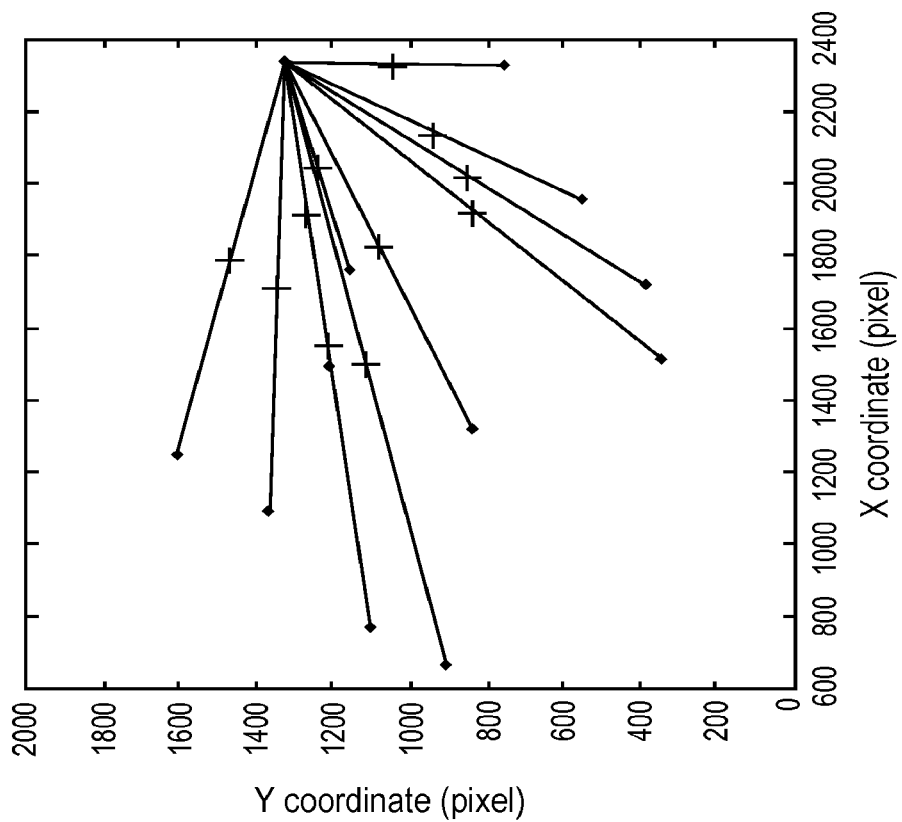
Figure 10C:
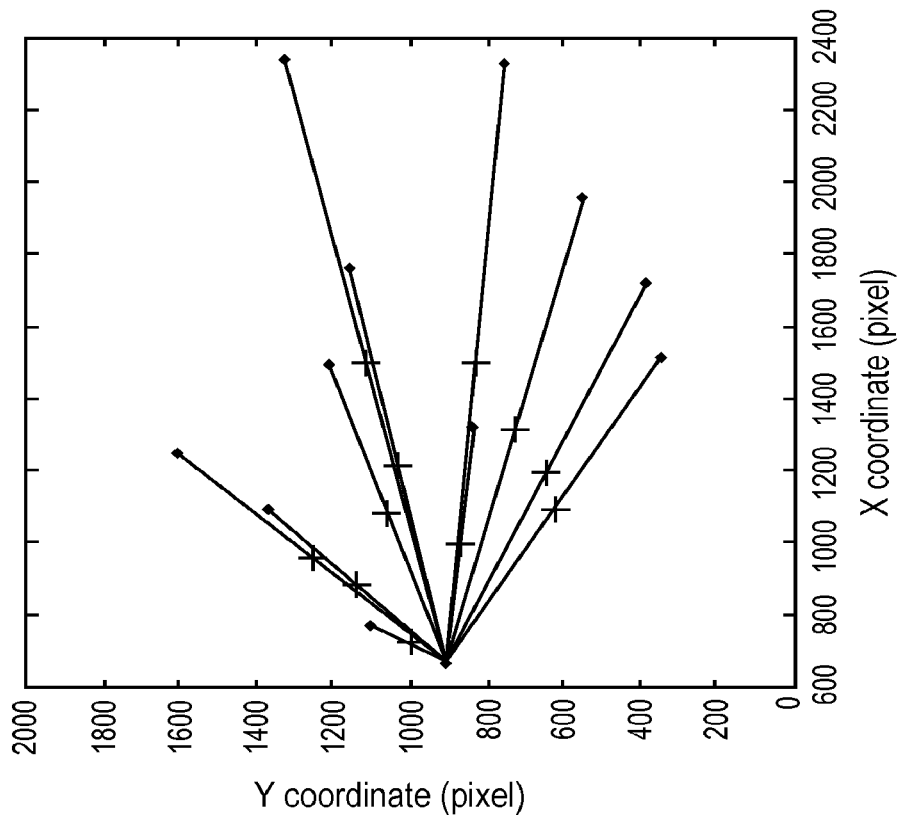
Figure 10F:
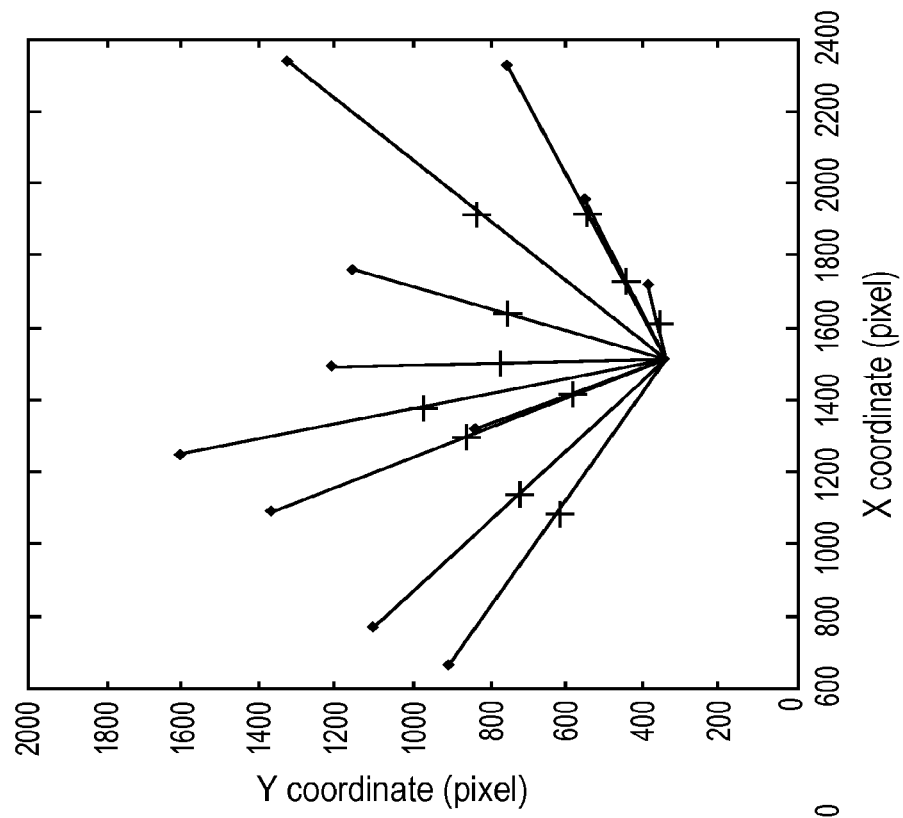
Figure 10E:
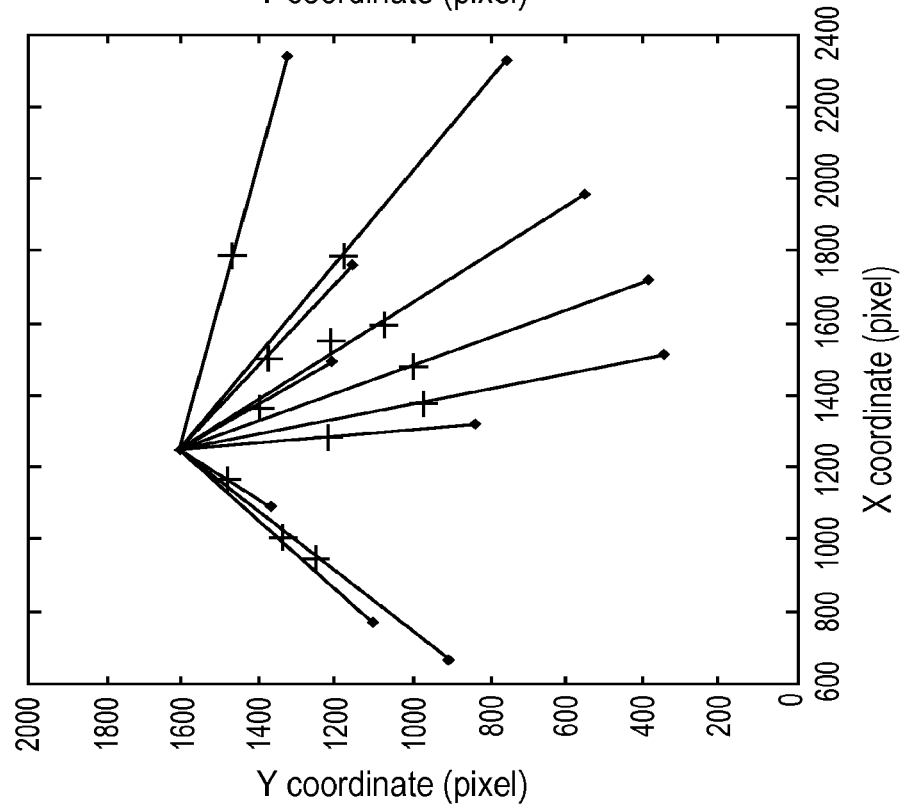

The affine transformation is defined as $$\begin{bmatrix} u \\ v \end{bmatrix} = \begin{bmatrix} a_1 & a_2 & a_3 \\ b_1 & b_2 & b_3 \end{bmatrix} \begin{bmatrix} x \\ y \\ 1 \end{bmatrix},$$

where (u, v) is the transformed coordinate of (x, y) and $$\begin{bmatrix} a_1 & a_2 & a_3 \\ b_1 & b_2 & b_3 \end{bmatrix}$$

is a parameter matrix that can be obtained by solving the above linear equation. The parameter matrix was determined by performing a registration of non-RPPVSM points from the input and the template patterns, which are called registration points. According to embodiments, FIGS. 10A-F show a process to generate registration points from a pattern of RPPVSMs; the registration points are labeled '+'. FIG. 10A shows the original RPPVSMs. FIG. 10B shows a Voronoi diagram of the RPPVSMs in FIG. 10A where registration points are the Voronoi vertices within the dashed line boundary. FIGS. 10C-F respectively show lines connecting the most left, the most right, the top and the bottom RPPVSMs with the rest RPPVSMs. The additional registration points are the middle of these lines. For some embodiments, such as those described below, these registration points may be obtained in the following way:

1) For each point set I and T, a Voronoi diagram was generated. Registration points were the vertices of the Voronoi diagram (marked as '+' in FIG. 10B) located within a bounding box formed by the top, bottom, most left, and most right RPPVSMs. The bounding box is the rectangular area given by the dashed line.
2) To obtain a stable alignment, more points were added as registration points. The points were generated from the middle of the lines connecting the most left RPPVSM with the rest RPPVSMs (see FIG. 10C). Similarly, middle points of the lines connecting the most right, top, and bottom RPPVSMs with the rest RPPVSMs were also added (see FIGS. 10D-F). This scheme works under the assumption that the four RPPVSMs forming the bounding box can be recognized in different images of the same person. Full back torsos could be seen in our images and the RPPVSMs were recognized by medical researchers trained in dermatology. Thus, this assumption could be fulfilled.

Figure 11B:
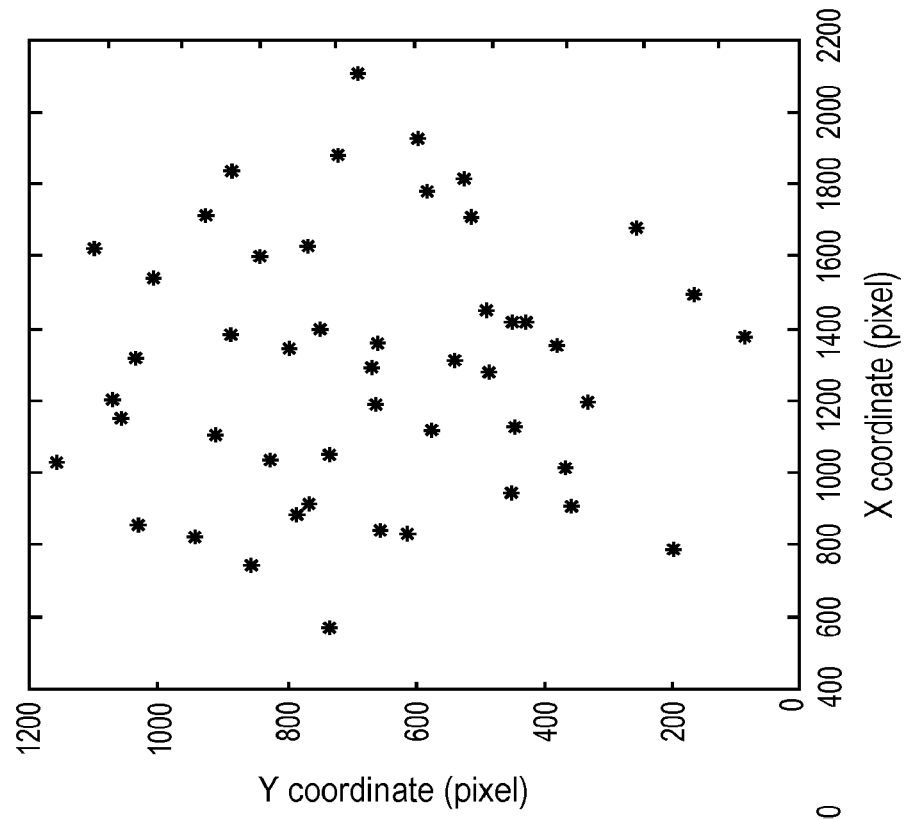
Figure 11A:
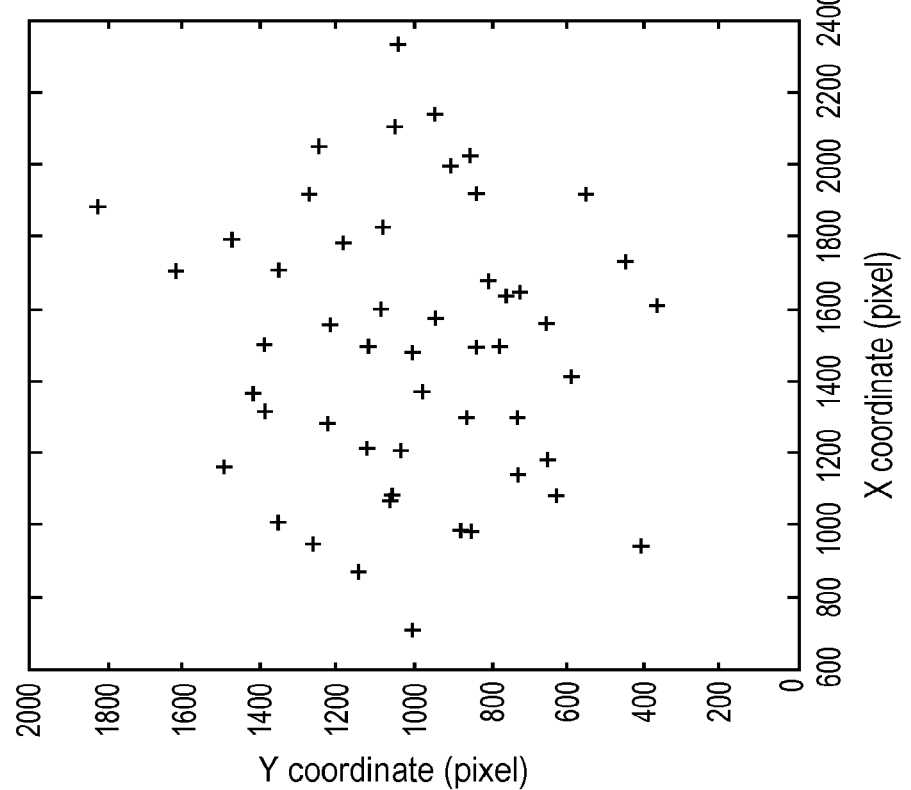
Figure 11D:
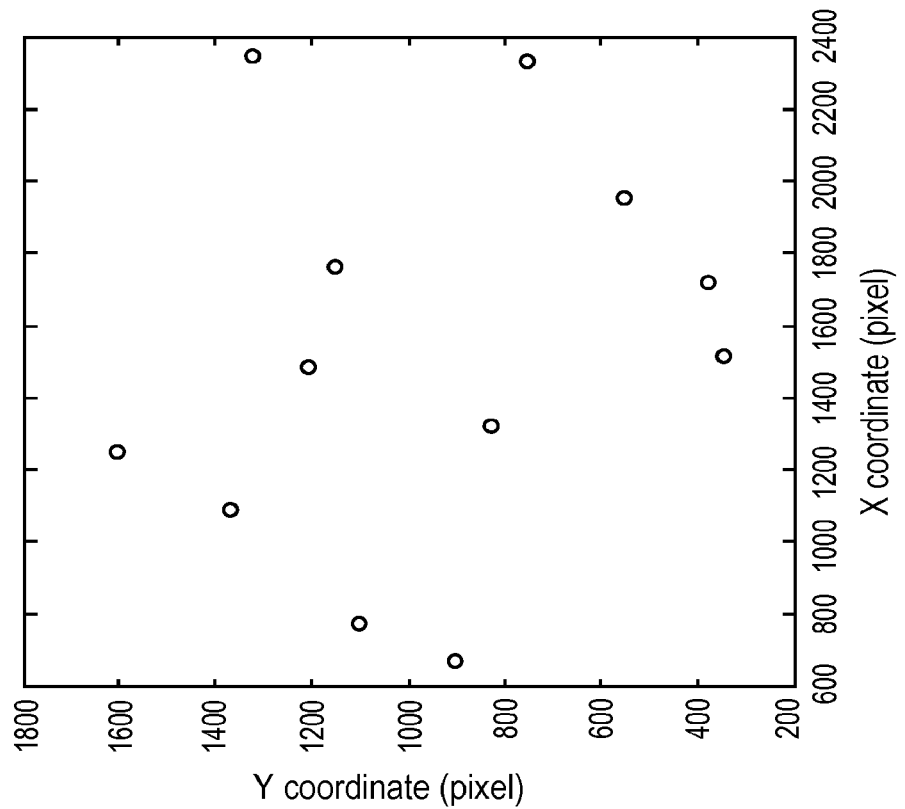
Figure 11C:
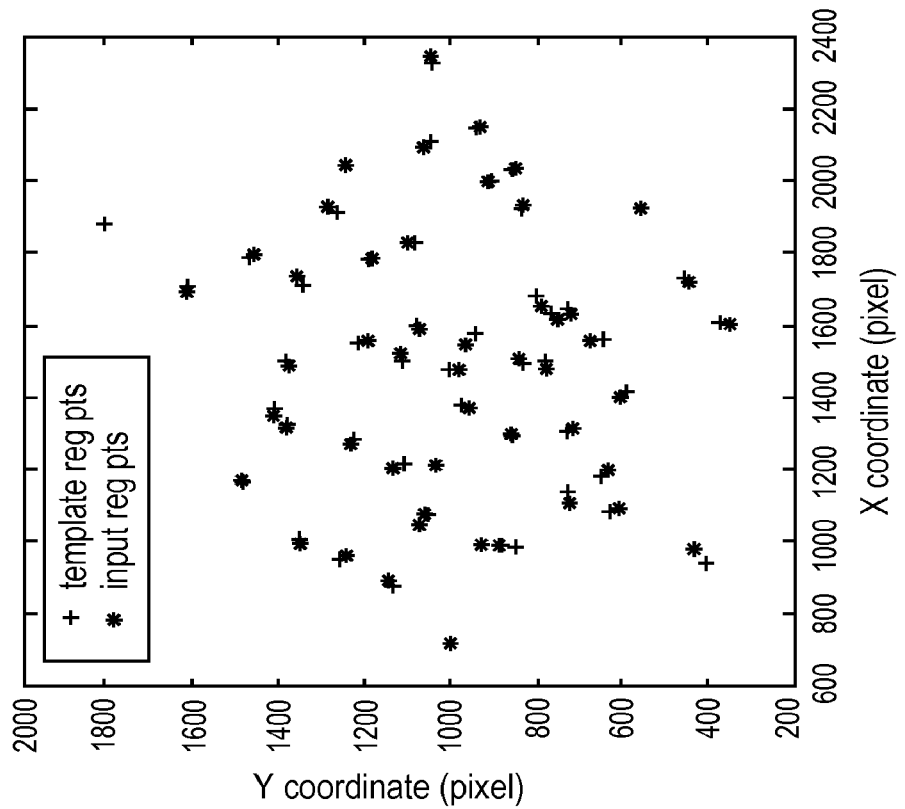

According to embodiments, FIGS. 11A-F show an illustration of the matching process. FIG. 11A shows registration points from a template pattern. FIG. 11B shows registration points from an input pattern. FIG. 11C shows the result of alignment. FIG. 11D shows RPPVSMs in the template pattern. FIG. 11E shows RPPVSMs in the input pattern. FIG. 11F shows the matched RPPVSMs indicated by the connected lines within the overlap area, which is denoted by the dashed lines. The registration points from the input pattern may be aligned to the registration points from the template pattern using the Coherent Point Drift (CPD) algorithm with affine transformation (see FIGS. 11A-C). Using the obtained affine transformation parameters, the RPPVSMs in the input pattern I were subsequently aligned to the template pattern T (see FIGS. 11D-F). Candidate correspondences between the template and the input RPPVSMs were searched using a k-Nearest Neighbor algorithm with k=1 and a correspondence was accepted if d≤$r_0$. The matching result is illustrated in FIG. 11F. The correspondences are connected by lines and the overlap area is denoted by the dashed lines. Only RPPVSMs located inside the overlap area may be considered in the matching.

A. Estimation of $r_0$

Figure 12:
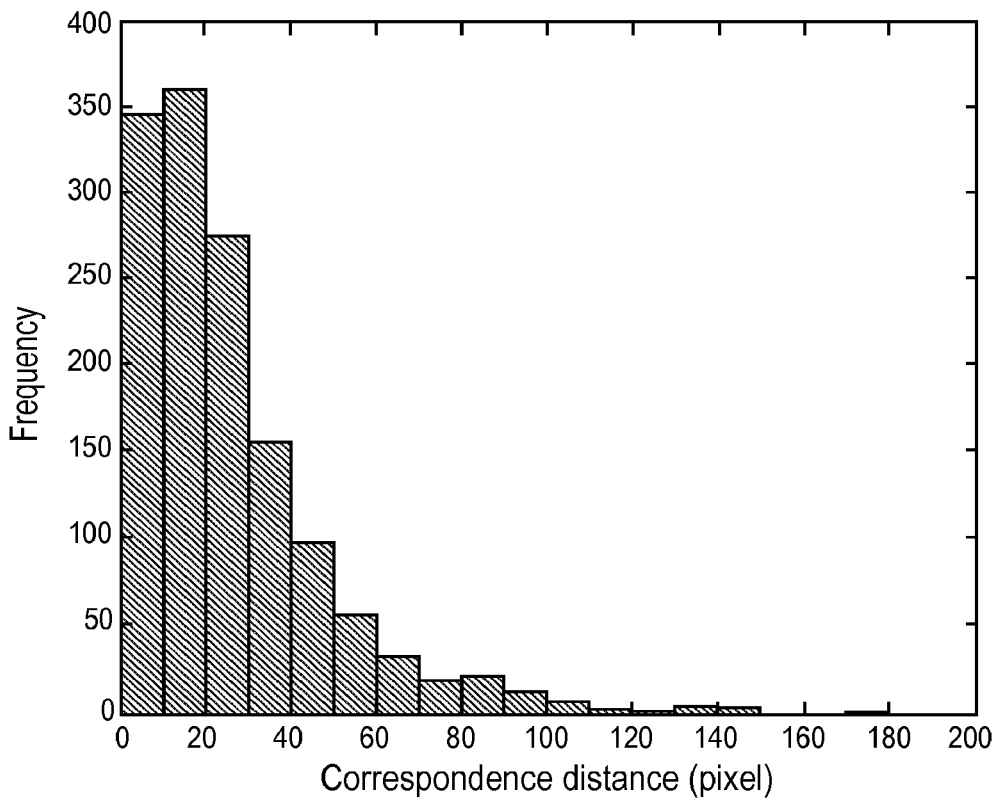
FIG. 12 shows a distribution of correspondence distances from 94 genuine pairs of RPPVSM patterns.

According to embodiments, five parameters A, C, m, n, and p may be required by the model. The values of A, m, and n are obtained from the empirical matchings. A is the intersection area between the input and the template patterns after alignment, and m and n are respectively the number of RPPVSMs in the template pattern and the input pattern within the overlap area. The value of p ranges from 0 to min(m, n). The value of C depends on the tolerance distance $r_0$. To determine $r_0$, we matched the genuine RPPVSM patterns in our database and obtained the distribution of their correspondence distances as given in FIG. 12. According to embodiments, FIG. 12 shows a distribution of correspondence distances from 94 genuine pairs of RPPVSM patterns. Images collected in the first session were used as the templates and the images collected in the second session were used as the inputs. Let $(x_i, y_i)$ be a RPPVSM in an input pattern and $(x_t, y_t)$ be a RPPVSM in a template pattern. $r_0$ is determined from (equation 15):

$$Pr(\sqrt{(x_t-x_i)^2+(y_t-y_i)^2} \leq r_0) \geq t, \qquad (15)$$

where t is a statistical threshold. According to embodiments, from 94 genuine pairs of RPPVSM patterns which qualified the CSR test, we obtained $r_0$=86.82 pixels and $r_0$=69.70 pixels for t=97.5% and t=95%, respectively.

Experimental Results and Discussion

A. Matching Performance

Figure 13:
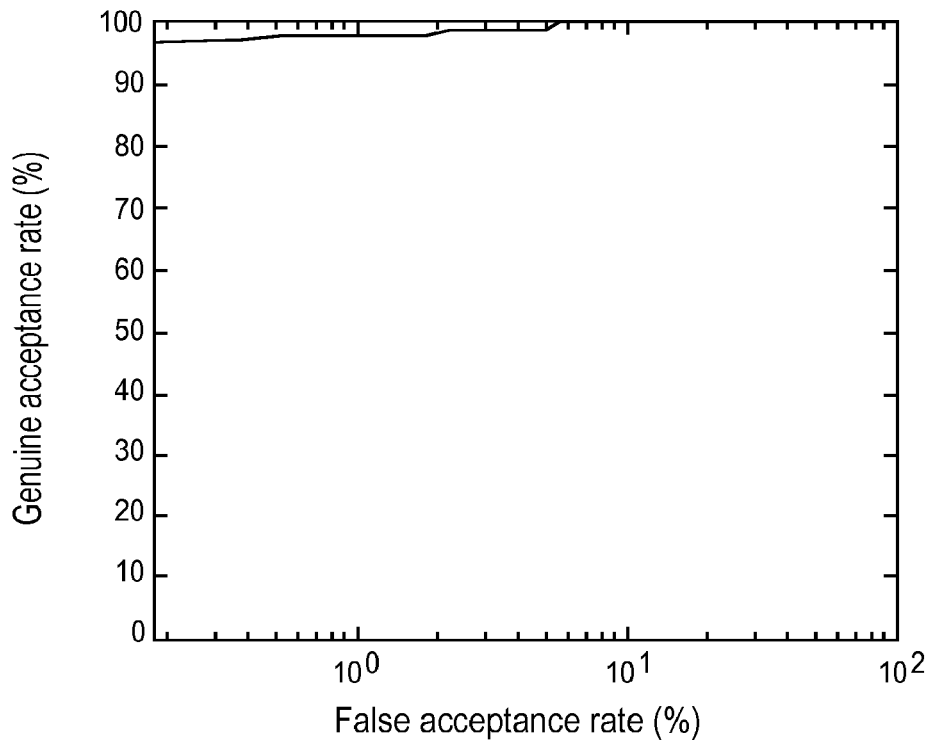
FIG. 13 shows the receiver operating characteristic (ROC) curve of RPPVSM matching.

According to embodiments, matching performance may be analyzed. For the matching experiment, $r_0$ may be set to 80 pixels, which was obtained by rounding down the correspondence distance at t=97.5% to the nearest ten. The value was rounded down to avoid many points being merged. The matching score was calculated using 2p/(m+n), where p is the number of correspondences, m is the number of RPPVSMs in a template pattern, and n is the number of RPPVSMs in an input pattern. FIG. 13 shows the receiver operating characteristic (ROC) curve of RPPVSM matching. According to embodiments, FIG. 13 shows the ROC curve of the genuine and the impostor matchings. When genuine acceptance is 96.81%, which is at matching score of 0.77, the corresponding false acceptance rate is 0.17%. Some genuine pairs could not be matched, because $r_0$ was selected to cover less than 97.5% of the genuine correspondences. Moreover, some impostor matches had high scores due to small numbers of RPPVSMs in the patterns.

B. Model Evaluation

According to embodiments, model evaluation may be performed. A set of parameters $M_i$, $m_i$, and $n_i$ and an empirical random correspondence $p_i \in [0, \min(n_i, m_i)]$ may be generated from each impostor matching. With the parameter sets from different impostor matchings, the distribution of random correspondence can be estimated. Let $X_i$ be a random valuable and $Pr(X_i=p|M_i, m_i, n_i)=Pr(M_i, m_i, n_i, p)$. If the theoretical model is correct, the empirical distribution can be approximated by (equation 16):

$$Pr(p) = \frac{1}{N}\sum_{i=1}^{N} Pr(M_i, m_i, n_i, p), \qquad (16)$$

where N is the number of impostor matchings. To standardize the unit for comparison, the theoretical probabilities were multiplied by N to obtain the frequencies of random correspondences. Eq. 16 is the average of the individual distributions with different parameter sets. Then, the difference between the theoretical and the empirical distributions was evaluated based on the 95% confidence interval of the theoretical frequency distribution. The confidence interval was generated as follows:

1) Let $R_i$ be an observation of a random sample from the distribution $Pr(X_i|M_i, m_i, n_i)$, where i=1, . . . , N. By counting the number of $R_i$ with p random correspondences, where p∈[0, $\max_i(\min(n_i, m_i))$], a frequency distribution was obtained.
2) Step 1 was repeated 3000 times to obtain a stable sampling result. Thus, we had 3000 frequency distributions.
3) Let $F_j(p)$ be the frequency of p random correspondences from the $j^{th}$ sampling process. Given a fixed p, each $F_j(p)$ could be considered as an observation from a one-dimensional distribution and its 2.5 percentile and 97.5 percentile were used to form the 95% confidence interval.

Even though in this experiment all the original RPPVSM patterns qualified the CSR test, if the overlap area A was small (i.e., less than 10% of the average value of A) or the RPPVSMs inside the overlap area may be too few (i.e., m<4 or n<4), the RPPVSM patterns inside the overlap area might no longer qualify the CSR hypothesis. Thus, matchings with small values of A, n, or m may be excluded. After the exclusion, 9,697 sets of parameters were kept for model evaluation.

Figure 14A:
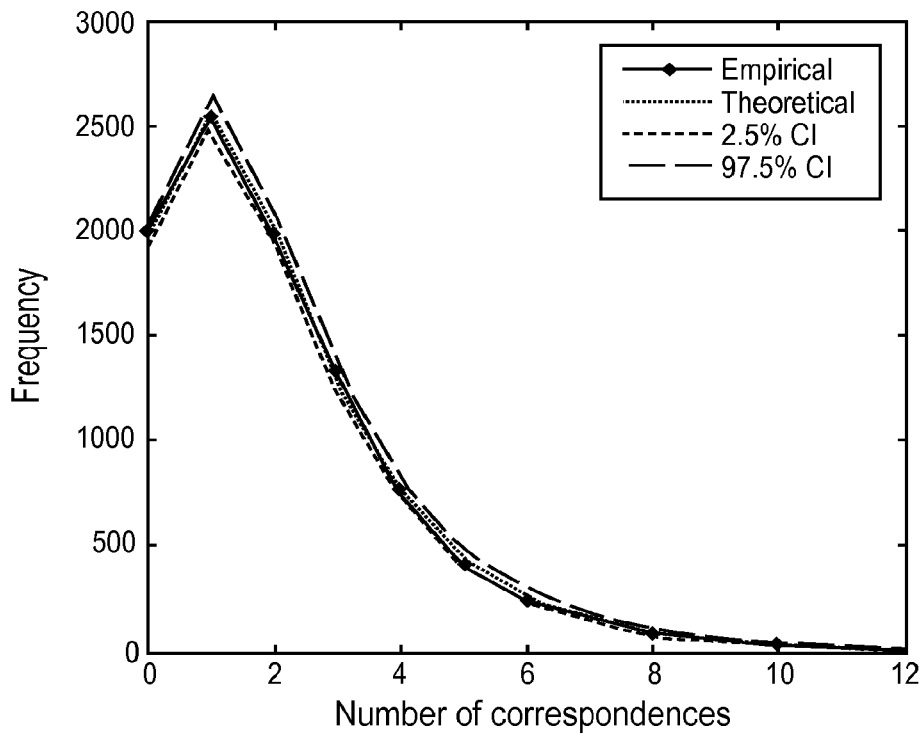
FIGS. 14A-B show a comparison of the empirical and theoretical random correspondences for $r_0=80$ pixels, and $r_0=75$ pixels.
Figure 14B:
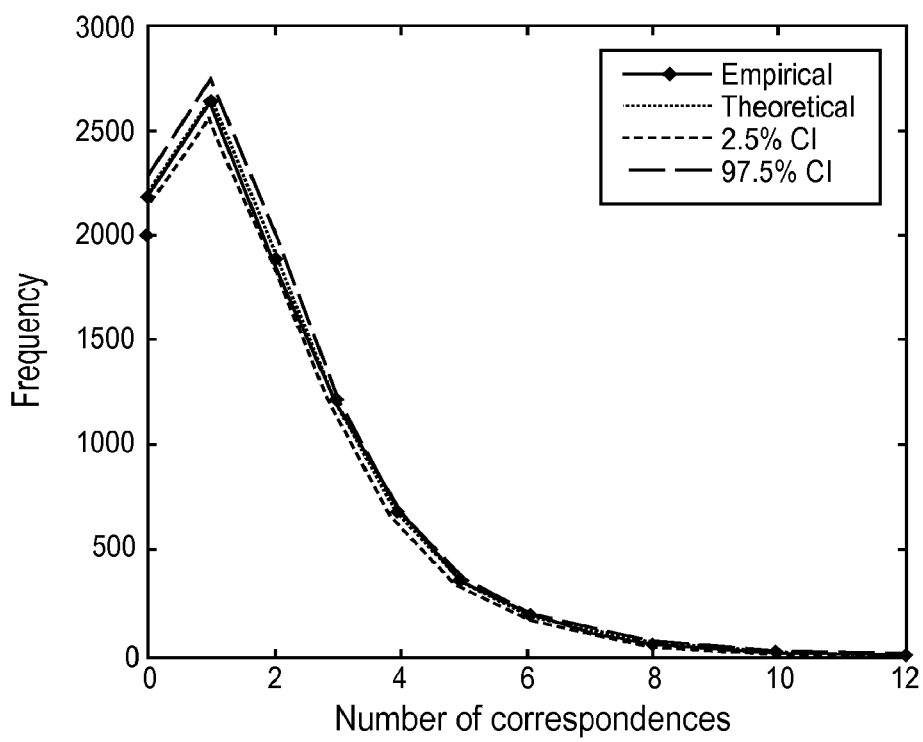

According to embodiments, FIGS. 14A-B show a comparison of the empirical and theoretical random correspondences for $r_0=80$ pixels (FIG. 14A), and $r_0=75$ pixels (FIG. 14B). FIG. 14A shows the empirical and theoretical frequency distributions of the RPPVSM random correspondences using $r_0=80$ pixels. It can be seen that the theoretical distribution fits the empirical distribution very well. More precisely, the empirical results are within the 95% confidence interval of the theoretical results. This implies that their difference is statistically insignificant. To confirm the result, we repeated the experiments using $r_0=75$ pixels (see FIG. 14B), whose corresponding statistical threshold was smaller but still in the range of t=95% and t=97.5% to maintain a similar matching performance with $r_0=80$ pixels. The plot shows consistency with the previous result, where all empirical results are within the 95% confidence interval of the theoretical results.

Predicted Error Rates for Verification and Identification

Verification (one-to-one matching) and identification (one-to-many matching) are two important scenarios in forensic investigation. Verification is performed when a suspect has been arrested, while identification is performed when law enforcement officers search a suspect in a given database. Since the probability of random correspondence measures the likelihood of finding a similar RPPVSM pattern from two different persons, the verification error rate can be estimated by Eq. 12 directly.

A. Verification

According to embodiments, based on a database of human studies, the average number of RPPVSMs in the middle to low density patterns may be 22. In some cases, we started our error rate estimation with this average value (i.e., m=22, n=22, p=22). Subsequently, the number of RPPVSMs was gradually decreased to predict the lower bound for reliable verification. The value of A was set to $1.5 \times 10^6$ pixels$^2$, which was the mean value of A in the impostor matching experiment. The value of $r_0$ was set to 80 pixels, based on the value used in the experiment above. Since evidence images (input) are typically of poorer quality than reference images (template), which can be collected from suspects directly, we considered the cases when n<m.

According to embodiments, the probabilities of random correspondence with different RPPVSM configurations may be given in Table IV. Non-matched events increase the probability of random correspondence significantly. For example, in Table IV(a), when one RPPVSM is not matched (m=22, n=22, p=21), the probability of random correspondence increases by 3 orders of magnitude from the full match (m=22, n=22, p=22). Then, when only 17 out of 22 RPPVSMs are matched, the probability increases by 11 orders of magnitude. The same trend can be seen from the other tables. The probability of random correspondence also increases when a few RPPVSMs are missing due to poor image quality. For example, when only 17 out of 22 RPPVSMs can be identified from the input image and all of them can be matched (m=22, n=17, p=17), the probability of random correspondence increases by 6 orders of magnitude compared to the ideal full match scenario (m=22, n=22, p=22). It can be seen that for all full match scenarios highlighted in Table IV (e.g., from m=22, n=22, p=22 to m=7, n=7, p=7), the probabilities of random correspondence are not greater than $5.04 \times 10^{-10}$.

TABLE IV

THEORETICAL PROBABILITIES OF RANDOM CORRESPONDENCE WITH DIFFERENT RPPVSM CONFIGURATIONS (a)
M = 22

| n | p=17 | p=18 | p=19 | p=20 | p=21 | p=22 |
|---|------|------|------|------|------|------|
| 22 | 1.46e−08 | 4.15e−10 | 6.99e−12 | 6.16e−14 | 2.26e−16 | 1.94e−19 |
| 21 | 3.67e−09 | 8.15e−11 | 1.01e−12 | 5.82e−15 | 1.05e−17 | N/A |
| 20 | 7.68e−10 | 1.25e−11 | 1.02e−13 | 2.88e−16 | N/A | N/A |
| 19 | 1.26e−10 | 1.35e−12 | 5.37e−15 | N/A | N/A | N/A |
| 18 | 1.46e−11 | 7.65e−14 | N/A | N/A | N/A | N/A |
| 17 | 8.87e−13 | N/A | N/A | N/A | N/A | N/A |

(b)
M = 17

| n | p=12 | p=13 | p=14 | p=15 | p=16 | p=17 |
|---|------|------|------|------|------|------|
| 17 | 9.55e−07 | 3.40e−08 | 7.07e−10 | 7.58e−12 | 3.32e−14 | 3.37e−17 |
| 16 | 3.07e−07 | 8.59e−09 | 1.31e−10 | 9.23e−13 | 1.99e−15 | N/A |
| 15 | 8.37e−08 | 1.72e−09 | 1.73e−11 | 5.96e−14 | N/A | N/A |
| 14 | 1.82e−08 | 2.46e−10 | 1.21e−12 | N/A | N/A | N/A |
| 13 | 2.83e−09 | 1.88e−11 | N/A | N/A | N/A | N/A |
| 12 | 2.37e−10 | N/A | N/A | N/A | N/A | N/A |

(c)
M = 12

| n | p=7 | p=8 | p=9 | p=10 | p=11 | p=12 |
|---|-----|-----|-----|------|------|------|
| 12 | 2.13e−04 | 1.13e−05 | 3.34e−07 | 4.93e−09 | 2.89e−11 | 3.83e−14 |
| 11 | 9.63e−05 | 4.01e−06 | 8.77e−08 | 8.49e−10 | 2.45e−12 | N/A |

TABLE IV-continued

THEORETICAL PROBABILITIES OF RANDOM CORRESPONDENCE WITH DIFFERENT RPPVSM CONFIGURATIONS

| 10 | 3.79e−05 | 1.17e−06 | 1.67e−08 | 7.96e−11 | N/A | N/A |
|---|---|---|---|---|---|---|
| 9 | 1.23e−05 | 2.48e−07 | 1.75e−09 | N/A | N/A | N/A |
| 8 | 2.96e−06 | 2.93e−08 | N/A | N/A | N/A | N/A |
| 7 | 3.99e−07 | N/A | N/A | N/A | N/A | N/A |

(d)
M = 7

| | | | p | | | |
|---|---|---|---|---|---|---|
| n | 2 | 3 | 4 | 5 | 6 | 7 |
| 7 | 0.1103 | 0.0144 | 8.84e−04 | 2.41e−05 | 2.40e−07 | 5.04e−10 |
| 6 | 0.0849 | 0.0087 | 3.96e−04 | 7.09e−06 | 3.48e−08 | N/A |
| 5 | 0.0610 | 0.0046 | 1.38e−04 | 1.22e−06 | N/A | N/A |
| 4 | 0.0394 | 0.0020 | 2.88e−05 | N/A | N/A | N/A |
| 3 | 0.0211 | 5.18e−04 | N/A | N/A | N/A | N/A |
| 2 | 0.0076 | N/A | N/A | N/A | N/A | N/A |

B. Identification

According to embodiments, the probability of false identification also called the False Positive Identification Rate (FPIR), can be estimated by $$1 - \prod_{i=1}^{h} (1 - Pr(M_i, m_i, n_i, p)),$$

where h is the size of database and each set of $(M_i, m_i, n_i)$ is generated from matching an input RPPVSM pattern with one template RPPVSM pattern in the database. In the following calculations, we assumed that all $(M_i, m_i, n_i)$ were the same and therefore, the probability of false identification could be estimated by $1-(1-Pr(M, m, n, p))^h$. We set the value of M based on the average value of A in the impostor matching experiment and $r_0=80$ pixels. We considered full match scenarios where $m_i=n_i=p$ (e.g., m=7, n=7, p=7).

According to embodiments, Table V lists probabilities of false identification with different RPPVSM configurations and different database sizes. A full match with 7 RPPVSMs in a database containing 100 persons gives a performance with error rate of $5.04\times10^{-8}$. However, when 7 RPPVSMs are used to identify a person in a database with 100 million people, the error rate is 0.049. However, a full match with 16 RPPVSMs for a database with 100 million people gives an error rate of $1.11\times10^{-8}$.

TABLE V

THEORETICAL PROBABILITIES OF FALSE IDENTIFICATION WITH DIFFERENT RPPVSM CONFIGURATIONS AND DATABASE SIZES

| Size of database, h | m = 7, n = 7, p = 7 | m = 10, n = 10, p = 10 | m = 12, n = 12, p = 12 | m = 14, n = 14, p = 14 | m = 16, n = 16, p = 16 |
|---|---|---|---|---|---|
| 100 | 5.04e−08 | 1.21e−10 | 3.83e−12 | 1.78e−13 | 1.11e−14 |
| 1,000 | 5.04e−07 | 1.21e−09 | 3.83e−11 | 1.78e−12 | 1.11e−13 |
| 10,000 | 5.04e−06 | 1.21e−08 | 3.83e−10 | 1.78e−11 | 1.11e−12 |
| 100,000 | 5.04e−05 | 1.21e−07 | 3.83e−09 | 1.78e−10 | 1.11e−11 |
| 1 million | 5.04e−04 | 1.21e−06 | 3.83e−08 | 1.78e−09 | 1.11e−10 |
| 10 million | 0.0050 | 1.21e−05 | 3.83e−07 | 1.78e−08 | 1.11e−09 |
| 100 million | 0.0492 | 1.21e−04 | 3.83e−06 | 1.78e−07 | 1.11e−08 |

CONCLUSIONS

The embodiments above with respect to FIGS. 9-14 have presented a novel biometric trait named Relatively Permanent Pigmented or Vascular Skin Marks (RPPVSM), such as for criminal and victim identification. RPPVSMs are stable and common in Caucasian, Asian, and Latino populations. Moreover, our embodiments show that RPPVSM patterns qualifying the CSR test can be very unique to an individual. We present embodiments of a model which accurately fit the empirical random correspondences from about 10,000 impostor matchings of CSR RPPVSM patterns. The empirical frequency distribution may fall within the 95% confidence interval of the theoretical frequency distribution, signifying that the model can accurately predict the empirical frequency distribution. Using the model, we can estimate the potential error rates of RPPVSM for verification and identification. It can be appreciated that embodiments described above for FIGS. 9-14 may perform processes and computer systems described above for FIGS. 7-8.

To conclude, various aspects of a technique for identifying a person based on relatively permanent pigmented and vascular skin mark patterns in images has been described. As explained above, an embodiment may be a machine-readable medium having stored thereon instructions, which program one or more data processing components (generically referred to here as a "processor") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad embodiments, and that the embodiments are not limited to the specific constructions and arrangements shown and described, since various other modifications may occur to those of ordinary skill in the art. For example, although the input 802 depicted in FIG. 8 is separate from computer 800, the input may be a digital camera (still or video) that is part of the computer, such as by being located within display 805. Also, computer 800 may be a portable digital camera having some or all of the other components of computer 800.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although some embodiments describe linear transformation and translation of the registration points, other non-linear transformation and translation of the registration points is also considered. The description is thus to be regarded as illustrative instead of limiting.

What is claimed is:

1. A method comprising:
   (a) identifying a first plurality of pigmented or vascular skin marks in a first image depicting a first skin area of a subject, the first image having a first pixel resolution;
   (b) identifying a second plurality of pigmented or vascular skin marks in a second image depicting a second skin area, the second image having a second pixel resolution;
   (c) aligning the first plurality of skin marks with the second plurality of skin marks, the aligning comprising selecting a base image and its pixel resolution from among the first image and the second image; and
   (d) determining a level of alignment between the first plurality of skin marks and the second plurality of skin marks based on identifying a number of pairs of aligned skin marks, each pair having a distance in pixels between the aligned skin marks that is less than or equal to a pixel distance threshold, thereby determining a likelihood of the first skin area and the second skin area overlapping and being from the same subject,
   wherein one or more of the above steps is performed by a processor.

2. The method of claim 1, wherein the step of aligning further comprises:
   selecting registration points for the first and second images; and
   transforming and translating the first and second images to align the registration points;
   wherein transforming and translating comprises one of a global transformation, an Affine transformation, a combined transformation for all images, or a transformation using a parameter matrix (A) and a vector (b) where x→Ax+b.

3. The method of claim 2, wherein selecting the base image comprises selecting an image having a lowest pixel resolution from among the first image and the second image; and
   wherein selecting registration points comprises one of selecting skin marks that are not pigmented or vascular skin marks, selecting points at a boundary of an area of skin that the pigmented or vascular skin marks are within, selecting points with a larger distance between the points than between any two adjacent pigmented or vascular skin marks of the first or second image, or selecting three registration points.

4. The method of claim 2, wherein transforming and translating comprises: preserving co-linearity relation between the registration points; and preserving ratios of distances along lines between the registration points.

5. The method of claim 1, wherein the step of aligning further comprises:
   a transformation using a parameter matrix (A) and a vector (b) where x→Ax+b; and
   calculating the parameter matrix (A) and the vector (b) using:

$$\begin{bmatrix} u \\ v \end{bmatrix} = \begin{bmatrix} a_0 & a_1 & a_2 \\ b_0 & b_1 & b_2 \end{bmatrix} \begin{bmatrix} 1 \\ x \\ y \end{bmatrix}$$

wherein (u, v) is a transformed coordinate of (x, y); and wherein $$\begin{bmatrix} a_0 & a_1 & a_2 \\ b_0 & b_1 & b_2 \end{bmatrix}$$

is a parameter matrix that can be obtained by solving the three equations, $$\begin{bmatrix} x_{ei} \\ y_{ei} \end{bmatrix} = \begin{bmatrix} a_0 & a_1 & a_2 \\ b_0 & b_1 & b_2 \end{bmatrix} \begin{bmatrix} 1 \\ x_{si} \\ y_{si} \end{bmatrix},$$

where i=1, 2 and 3.

6. The method of claim 1, further comprising determining a size parameter for overlapped total skin area of the first image and the second image by determining a number of overlapped skin pixels of the first image and the second image.

7. The method of claim 6, wherein the pigmented or vascular skin marks comprise one or more types of nevi, seborrheic keratosis, ephelides, lentigos, or cheery hemangiomas.

8. The method of claim 7, wherein the pigmented or vascular skin marks comprise nevi.

9. The method of claim 6, further comprising selecting the pixel distance threshold to be a number of pixels for which at least a selected percentage of the first plurality of pigmented or vascular skin marks and the second plurality of pigmented or vascular skin marks are among the pairs of aligned skin marks.

10. The method of claim 9, wherein the selected percentage is 97.5 percent.

11. The method of claim 9, further comprising projecting the first plurality of pigmented or vascular skin marks and the second plurality of pigmented or vascular skin marks onto a two-dimensional space based on the base image and its pixel resolution.

12. The method of claim 11, wherein the size parameter and the pixel distance threshold are determined in the two-dimensional space based on the base image and its pixel resolution.

13. The method of claim 6, further comprising determining the number of pairs of aligned skin marks based on the pixel distance threshold.

14. The method of claim 13, further comprising calculating a correspondence probability that the first plurality of pigmented or vascular skin marks and the second plurality of pigmented or vascular skin marks are from the same subject or different subjects.

15. The method of claim 14, wherein the step of calculating a correspondence probability comprises calculating $$p(A,C,n,m,p) = C_p^n \Pi_{i=0}^{p-1}((m-i)C/A-iC)\Pi_{i=p}^{n-1}(A-(m-p+i)C/A-iC)$$

wherein:
A is the size parameter for overlapped total skin area of the first image and the second image;
$C=\pi r^2$, where r is the pixel distance threshold;
n is the number of pigmented or vascular skin marks identified in one of the first plurality of pigmented or vascular skin marks and the second plurality of pigmented or vascular skin marks;
m is the number of pigmented or vascular skin marks identified in the other of the first plurality of pigmented or vascular skin marks and the second plurality of pigmented or vascular skin marks;
p is the number of pairs of aligned skin marks; and
$C^p_n$ is $n!/p!(n-p)!$.

16. The method of claim 13, further comprising using the correspondence probability as evidence in a legal case.

17. The method of claim 14, further comprising using the correspondence probability to achieve a conviction in the legal case.

18. The method of claim 1, wherein the first pixel resolution and the second pixel resolution are the same.

19. A non-transitory machine-readable medium having data therein which, when accessed by a processor, causes the processor to:
   (a) identify a first plurality of pigmented or vascular skin marks in a first image depicting a first skin area of a subject, the first image having a first pixel resolution;
   (b) identify a second plurality of pigmented or vascular skin marks in a second image depicting a second skin area, the second image having a second pixel resolution;
   (c) align the first plurality of skin marks with the second plurality of skin marks, the aligning comprising selecting a base image and its pixel resolution from among the first image and the second image; and
   (d) determine a level of alignment between the first plurality of skin marks and the second plurality of skin marks based on identifying a number of pairs of aligned skin marks, each pair having a distance in pixels between the aligned skin marks that is less than or equal to a pixel distance threshold, thereby determining a likelihood of the first skin area and the second skin area overlapping and being from the same subject.

20. A system comprising:
a processor;
a digital image input;
a memory coupled to said processor and containing code which when executed:
   (a) identifies a first plurality of pigmented or vascular skin marks in a first image depicting a first skin area of a subject, the first image having a first pixel resolution;
   (b) identifies a second plurality of pigmented or vascular skin marks in a second image depicting a second skin area, the second image having a second pixel resolution;
   (c) aligns the first plurality of skin marks with the second plurality of skin marks, the aligning comprising selecting a base image and its pixel resolution from among the first image and the second image; and
   (d) determines a level of alignment between the first plurality of skin marks and the second plurality of skin marks based on identifying a number of pairs of aligned skin marks, each pair having a distance in pixels between the aligned skin marks that is less than or equal to a pixel distance threshold, thereby determining a likelihood of the first skin area and the second skin area overlapping and being from the same subject.

\* \* \* \* \*